(12) United States Patent
O'Rourke et al.

(10) Patent No.: US 9,229,694 B2
(45) Date of Patent: Jan. 5, 2016

(54) SYSTEMS AND METHODS FOR FACILITATING APPLICATION DEVELOPMENT UTILIZING PLUGINS

(71) Applicant: Gamesys Ltd., London (GB)

(72) Inventors: Tobias Patrick O'Rourke, Haslemere (GB); Rik Ward, London (GB)

(73) Assignee: Gamesys Ltd., London (GB)

( * ) Notice: Subject to any disclaimer, the term of this patent is extended or adjusted under 35 U.S.C. 154(b) by 0 days.

(21) Appl. No.: 14/216,267

(22) Filed: Mar. 17, 2014

(65) Prior Publication Data

US 2014/0282453 A1    Sep. 18, 2014

Related U.S. Application Data

(60) Provisional application No. 61/800,778, filed on Mar. 15, 2013.

(51) Int. Cl.
*G06F 9/45* (2006.01)
*G06F 11/36* (2006.01)
*G06F 9/44* (2006.01)

(52) U.S. Cl.
CPC ............. *G06F 8/41* (2013.01); *G06F 11/3624* (2013.01); *G06F 8/71* (2013.01)

(58) Field of Classification Search
USPC .......................................................... 717/154
See application file for complete search history.

(56) References Cited

U.S. PATENT DOCUMENTS

| 7,546,576 B2 | 6/2009 | Egli |
| 7,620,648 B2 | 11/2009 | Cragun et al. |
| 7,992,135 B1* | 8/2011 | Wong et al. .................... 717/126 |
| 8,285,813 B1 | 10/2012 | Colton et al. |
| 8,291,079 B1 | 10/2012 | Colton et al. |
| 8,296,729 B2* | 10/2012 | Ficatier ...................... G06F 8/33 717/104 |
| 8,458,612 B2 | 6/2013 | Chatterjee et al. |
| 8,468,577 B1 | 6/2013 | Pooley et al. |
| 8,533,336 B1 | 9/2013 | Scheffler et al. |
| 8,832,572 B2* | 9/2014 | Waher ........................... 715/762 |
| 2002/0046240 A1 | 4/2002 | Graham et al. |

(Continued)

FOREIGN PATENT DOCUMENTS

WO    WO2009018277    2/2009

OTHER PUBLICATIONS

Alafi, Manar H., "A Verification Framework for Access Control in Dynamic Web Applications" Dissertation/Thesis DAI-B 72/04, Dissertation/thesis No. NR69949, Oct. 2011, Queen's University (Canada); 218 pps.

*Primary Examiner* — Don Wong
*Assistant Examiner* — Marina Lee
(74) *Attorney, Agent, or Firm* — Michael D. Downs; Fincham Downs, LLC

(57) ABSTRACT

Systems, apparatus, methods, and articles of manufacture provide for determining at least one criterion for establishing an offer campaign based on a player's experience on gaming platform (e.g., via a gaming website) and/or determining whether a player qualifies for one or more offers based on the player's experience.

20 Claims, 10 Drawing Sheets

(56) References Cited

U.S. PATENT DOCUMENTS

| | | |
|---|---|---|
| 2003/0226111 A1 | 12/2003 | Wirts et al. |
| 2003/0233631 A1 | 12/2003 | Curry et al. |
| 2004/0046789 A1 | 3/2004 | Inanoria |
| 2004/0268312 A1 | 12/2004 | Abe et al. |
| 2006/0184925 A1* | 8/2006 | Ficatier .............. G06F 8/33 717/163 |
| 2007/0011650 A1 | 1/2007 | Hage et al. |
| 2007/0079299 A1* | 4/2007 | Daly .............. G06F 8/30 717/141 |
| 2011/0016477 A1* | 1/2011 | Schechter et al. ......... 719/330 |
| 2011/0219311 A1* | 9/2011 | Diament et al. .......... 715/736 |
| 2012/0159358 A1* | 6/2012 | Waher .............. 715/762 |
| 2014/0157239 A1* | 6/2014 | Goetsch .............. 717/126 |
| 2014/0282453 A1* | 9/2014 | O'Rourke et al. ......... 717/154 |

* cited by examiner

SYSTEMS AND METHODS FOR FACILITATING APPLICATION DEVELOPMENT UTILIZING PLUGINS

CROSS-REFERENCE TO RELATED APPLICATIONS

The present application claims the benefit of priority of U.S. Provisional Patent Application No. 61/800,778 filed Mar. 15, 2013, entitled "SYSTEMS AND METHODS FOR FACILITATING APPLICATION DEVELOPMENT UTILIZING PLUGINS," which is incorporated by reference in its entirety in the present application.

BRIEF DESCRIPTION OF THE DRAWINGS

An understanding of embodiments described in this disclosure and many of the related advantages may be readily obtained by reference to the following detailed description when considered with the accompanying drawings, of which.

DETAILED DESCRIPTION

A. Introduction

Figure 1:
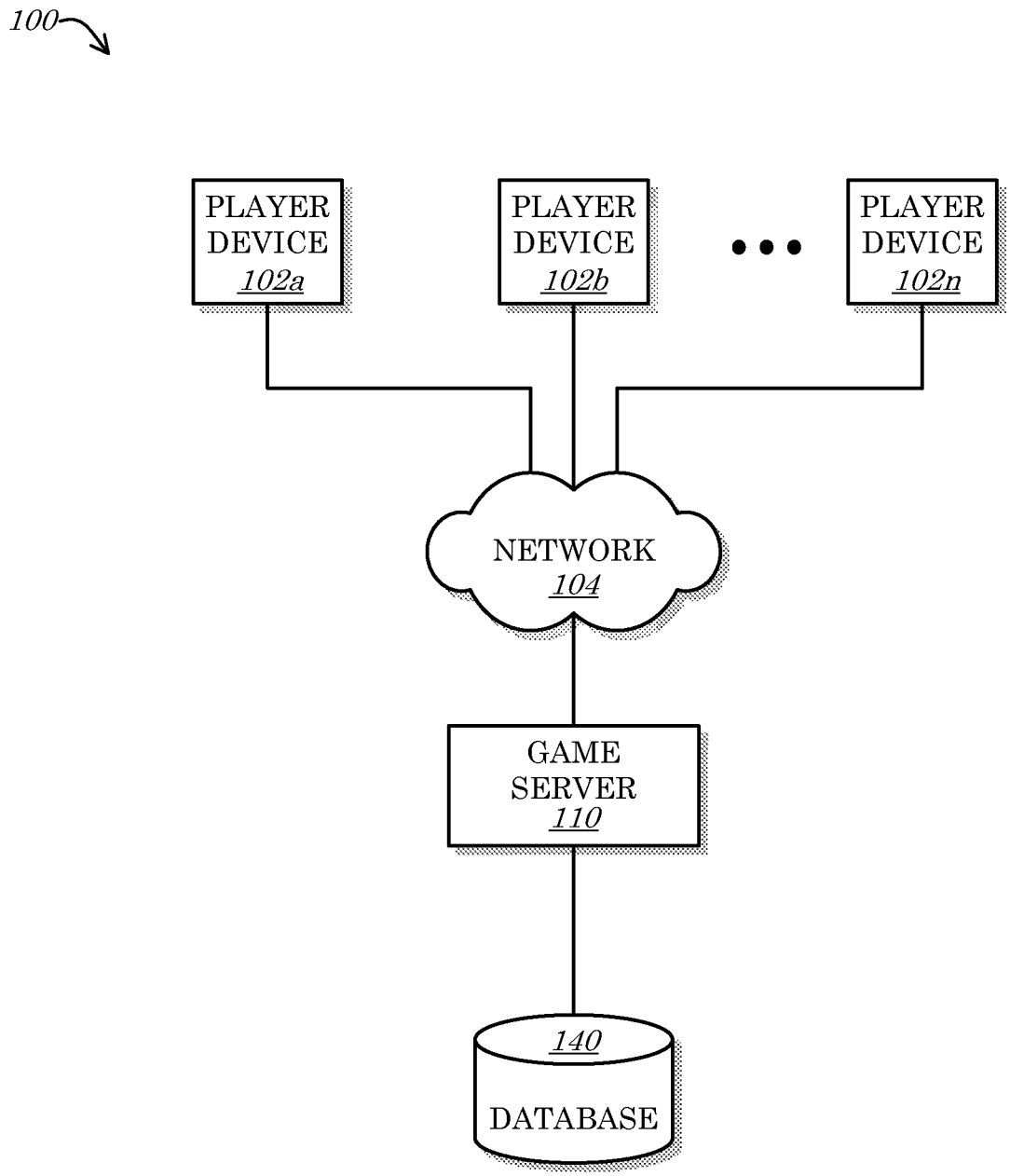
FIG. 1 is a block diagram of a system according to one or more embodiments.

According to some embodiments described in this disclosure, a client device or other type of network device may request a web application from a server via a network. In one or more embodiments, a client device comprises an electronic device (e.g., under the control of a user) capable of requesting and receiving resources over the network. In some embodiments, a client device may comprise a user application, such as a web browser, to facilitate the sending and receiving of data over the network. For example, a web browser may enable a user (e.g., via a user interface) to display and interact with text, images, videos, music, web applications and other information (e.g., located on a web page at a website on the World Wide Web or a local area network).

In one embodiment, a client device may send a request for a web application (e.g., an on-line bingo game application) to a server (e.g., a game server), the request including an identifier that indicates the requested web application. For example, a web browser on a client device requests a web page from a server using a universal resource locator (URL) and receives a hypertext markup language (HTML) file from the server. The HTML file may include, for example, a script (e.g., JavaScript™ script) that sends a web application request to the server for the web application associated with the requested URL. In some embodiments, the server hosts a plurality of different web applications (e.g., created by one or more respective developers) and identifies the requested web application based on an identifier in the web application request. In accordance with one or more embodiments, the server may include a plurality of plugins used to provide information and/or services in one or more web applications, and the server further comprises specifications for a plurality of web applications, the specifications including respective plugin identifiers that identify any one or more plugins associated with a given web application.

In accordance with one or more embodiments described in this disclosure, one plugin associated with a given web application may be developed by a first development team, while a second plugin associated with the same web application may be developed by a second, different development team. Also, in accordance with one or more embodiments, a given plugin may be associated with more than web application. Accordingly, it is desirable that where plugins may be developed by different developers for use within a common application platform (e.g., a client delivery system), any platform standards are enforced before the plugin code is released to the platform, in order to avoid potential conflicts or errors in functional performance and/or stylistic considerations.

Applicants have recognized that distributed development and maintenance provide unique challenges during both the development process and runtime integration. For example, maintaining the consistency of coding style across different plugins may become an issue in a distributed development model. Further, at the integration (rendering) layer, many types of browsers do not currently support any kind of CSS sandboxing, so it is possible to encounter unexpected user interface (UI) problems at runtime without developer discipline. Also, some of the fundamentals of the JavaScript™ (JS) language design may lead to similar functional issues. Some of these types of problems with plugin development may be solved in part by "sandbox" functionality (e.g., separating plugin processes at runtime) and/or by standard UI design templates (as may be defined in a library or "style guide" of web components available to developers).

Applicants have recognized, however, that while a style guide may provide a library of consistent, device-aware HTML templates and conventions, it cannot enforce how such templates are actually utilized in the plugins defined by plugin developers. Further, a style guide cannot address any potential functional issues with additional plugin code developed independently by developers, such as, for example, additional bespoke CSS written specifically for "skinning" a website to produce a desired visual layout (e.g., of a unique website or group of websites). A final implementation of a plugin may contain a number of issues, including but not limited to, one or more of: CSS selector specificity, separation of structure CSS and skin CSS, changes to the state of global variables in a global environment shared among multiple plugins, naming conventions, coding style, syntax formatting and/or performance issues.

According to some embodiments of the present invention, a plugin architecture and/or plugin certification process of a client delivery platform addresses issues associated with parallel, distributed development and/or maintenance of plugins. Applicants have recognized that problems related to plugins developed in the above manner for deployment on a common platform may be better approached by the enforcement of policies and conventions (referred to in this disclosure as "platform standards") agreed upon, for example, by development teams working on various features and element of the common platform. According to some embodiments, enforcement may comprise an automated plugin certification process (e.g., implemented when plugins are compiled from source code) to verify that plugin code conforms to the platform standards. In one embodiment, a plugin certification process addresses these issues as an automated series of build-time checks on plugins, using static code analysis to ensure conformance of plugin code to agreed-upon platform standards (also referred to in this disclosure as "platform plugin standards" (PPS)).

In accordance with some embodiments of the present invention, one or more systems, apparatus, methods, articles of manufacture, and/or computer readable media (e.g., a non-transitory computer readable memory storing instructions for directing a processor) provide for one or more of: (i) determining plugin data defining one or more plugins (e.g., receiving source code for a web application plugin); (ii) determining one or more platform standards for plugins (e.g., specifications agreed upon by developers for plugins used in a software platform production environment); (iii) initiate a compile or build process for one or more plugins (e.g., for generating executable software instructions based on source code); (iv) performing a plugin certification process (e.g., for verifying that a plugin specification or source code meets one or more requirements for an application environment).

In accordance with some embodiments of the present invention, one or more systems and/or apparatus provide for one or more of: (i) a plugin certification system comprising one or more of a user interface, a plugin repository, a plugin certification program and a plugin compiler; (ii) a platform production environment for serving applications utilizing plugins to users (e.g., a gaming platform production environment for providing web applications to on-line game players); and (iii) build tools for use in developing plugins and/or other types of software components.

In accordance with some embodiments of the present invention, one or more systems, apparatus, methods, articles of manufacture, and/or computer readable media provide for one or more of: (i) receiving source code defining at least one plugin; (ii) determining at least one platform plugin standard for certifying plugins; (iii) determining at least one platform plugin standard for CSS (e.g., predetermined requirements for CSS selector, structural CSS and/or skinning CSS); (iv) determining at least one platform plugin standard for document object model (DOM) elements; (v) reviewing and/or analyzing one or more plugins based on at least one platform plugin standard; and/or (vi) certifying plugins passing at least one platform plugin standard and/or rejecting any plugins failing one or more platform plugin standards.

Various types of plugin platform standards may be implemented for use in a client delivery platform and/or verified in a plugin certification process. Some examples are discussed in this disclosure, and others will be readily apparent to those skilled in the relevant art, in light of the present disclosure. In some embodiments, a plugin platform standard may comprise a standard for a CSS selector. Due to the cascading nature of CSS, if a CSS selector for a given plugin is too general, it may affect the CSS of other plugins at runtime (e.g., due to a lack of boundaries within the browser). On the other hand, if it is too specific, it may be difficult to override or extend when necessary. Accordingly, a platform standard may be established as to the appropriate type of CSS selectors to use, in order to minimize problems that may arise as a result of inappropriate CSS selector specificity.

In one or more embodiments, a platform standard may comprise a standard to address the potential for incorrect separation of structural CSS and skin CSS (also referred to in this disclosure as "skinning CSS"). In one embodiment, a build process may encourage appropriate re-use of CSS by including a style guide within the final CSS build of a website. However, a style guide may assume appropriate separation, within plugins, of different CSS (e.g., structural CSS, skinning CSS), making it possible for a developer to violate the presumed separation (e.g., by adding skinning attributes to the wrong file) and cause undesirable behavior (especially when plugins are shared across sites).

In one or more embodiments, while a sandbox may restrict the particular DOM elements and/or global JavaScript™ variables available to runtime code (e.g., JavaScript code), it is still possible to change global state (e.g., due to developer error) as a result of the default variable scoping rules of the JavaScript™ language (e.g., in which a variable is global unless prefixed with the "var" tag). When running plugins in isolation this may not be an issue, but where a global environment is shared between all plugins in use in a browser, unintended consequences may occur. In some embodiments, one or more static code analysis tools (e.g., JavaScript analysis tools such as jshint) may be utilized to find and warn of these types of violations (e.g., as part of an automated plugin certification process).

In one or more embodiments, a plugin certification process may include standards for consistency in naming conventions, coding style and/or syntax formatting (e.g., across HTML, CSS, JS and/or other language). Such standards are desirable from the long-term view of promoting ease of understanding and maintenance of plugins, and may be implementing as check within a plugin certification process.

In addition to functional concerns related to plugins, certain policies and standards with respect to non-functional considerations (e.g., performance optimization of plugins) may also be verified, in accordance with some embodiments, in a plugin certification process. In some embodiments, a certification process may include performance standards related to download speeds, memory consumption and/or the like (particularly on mobile devices and networks). In one example, a plugin platform standard may require a verification check that any bitmap image assets within a plugin not exceed more than predetermined size (e.g., in kilobytes), due to the detrimental impact of larger bitmaps on downloads and memory consumption.

In some embodiments, upon committal of source code to the relevant repository, a plugin certification process runs, as part of a build process, a series of pre-defined checks against established plugin standards, in order to provide a level of confidence that the final built artefact does not contain any known violations. If the code passes all checks, the build may be made available upstream (e.g., in a production environment). If any checks are failed, an indication of the error may be output (e.g., to a developer via a user interface) the build may correspondingly fail and/or the artefact may be prevented from being released until the indicated error is fixed. After a subsequent commit is made, the checks are re-run, and the plugin certification process may be repeated until all checks are passed.

Applicants have recognized, in accordance with some embodiments of the present invention, that it may be advantageous to provide for an application development and delivery system in which:

1. Plugins can be deployed, developed, and scaled independently of each other. Accordingly, plugins may be developed as separate codelines or applications, by different development teams, using separate source control repositories, for example, but that can be compiled into a single code artefact repository (e.g., accessed for use and/or deployed to different machines).

2. Separate plugins can be delivered as different runtime code, deployable into different datacenters. For example, specific plugins may be deployed (e.g., a deposit function for receiving customer deposits into customer financial accounts) into a datacenter local to a particular jurisdiction (e.g., should regulations so require).

3. A set of development tools allows for the providing of plugins and/or other types of applications (e.g., by a gaming provider) that maintain consistent design and user experience (UX) values (e.g., in application interfaces), even though plugins may be developed by different codelines and/or teams, such that plugins run independently but appear to an end user as one integrated piece of software (e.g., due to the compliance with style guides and/or platform standards for plugins enforced at compile time).

According to one or more embodiments, a "client delivery platform" or "client delivery system" primarily solves a problem of scale and complexity in application development. Problems associated with scaling development may be addressed, in accordance with some embodiments, by effectively "breaking" a website (typically a single executable or deployable application maintained by a single (often large) team) into a composite of smaller applications (e.g., including one or more plugins), maintained by multiple, smaller development teams. By ensuring plugin compliance with platform-wide standards (e.g., at compile time), each development team is able to move at its own pace, address respective areas of responsibility, and make sensible technology decisions to solve its own particular problem(s).

According to some embodiments, a client delivery system allows for the building of a fully functional gaming website from a number of discrete "plugins" (e.g., client-side applications) aggregated by a "Home App" system for assembling the plugins (and any layout elements), and run in a user's browser. In some embodiments, plugins may be isolated from each other (e.g., at run time) by a "sandbox" and may only communicate by responding, for example, to events emitted by other plugins. Plugins are intended to be run on different hardware and may be owned by different software teams for purposes of maintenance, modification, and/or development.

According to some embodiments, in order to maintain visual consistency of a particular implementation of a web application, a suite of tooling, known as "Bootstrap", a user experience (UX) pattern guide, CSS styles, JavaScript™ (JS), sample code, and compile time tools may be utilized to enable disparate teams (who may be employed by a variety of different companies) to maintain a cohesive UX across their plugins.

In one example implementation, the problem of application scaling (i.e., handling more concurrent users) may be addressed by mandating that plugins are stateless. Accordingly, caching available across the Internet may be leveraged, for example, at one or more caches of content delivery networks (CDNs), Internet service providers (ISPs) and/or user browsers. Stateless applications typically perform more efficiently than a stateful one. Accordingly, the client delivery platform may be configured to minimize the expense of both bandwidth and computing power as demand grows.

In solving these problems, a solution, according to some embodiments, introduces the complexity of managing the UX when the application effectively has multiple owners, such as by providing "bootstrap" tool chain to maintain a consistent UX across disparate plugins.

According to some embodiments, a client delivery platform comprises a "Home App" for providing customized configurations of available plugins for specific implementations or ("propositions") (e.g., for particular websites, games, game providers and/or jurisdictions). This is done, for example, by requesting resources from the configured plugin provider URLs and combining them into a single HTML document, plus single CSS and JS files. These may be player agnostic and may be cached advantageously at the application, CDN, ISP, and/or browser level for a significant period of time.

In one embodiment, once requested by a client device, the plugins are instantiated. The plugin API makes certain functionality available to the plugin and prevents the plugin from reaching outside of its "sandbox", changing the document object model (DOM) or behavior of another plugin, for example.

Visual consistency may be maintained by plugin authors adhering to style guides published in the bootstrap. In some embodiments, tools may be available: (1) to verify at build time that a plugin's definition (e.g., HTML markup) is consistent with the style guide and/or (2) to build proposition-specific customizations of that style guide (e.g., making buttons red).

In accordance with one or more embodiments, problems of scale, both of development and users, may be addressed by providing a new framework in which to build applications that allows separate concerns of development, deployment and even technology choice to be addressed by separate development teams. For example, it does not matter whether a team wants to write in Java®, Scala, Ruby or Assembler programming languages; so long as the markup and JS to be delivered to the client is valid (e.g., according to the verification by the build tools), the plugin will work. Accordingly, running software may be scaled horizontally on a very granular level. Further, development may be scaled horizontally by building different teams around different plugins.

Some embodiments may be utilized advantageously by full stack gaming providers who experience a unique problem of scale. Some providers typically attempt to manage scale by outsourcing pieces of their functionality. For example, some providers may only offer certain functionality (e.g., a chat plugin) with a specific web proposition (e.g., a particular bingo game) because it executes in a web application (also referred to as a "console") delivered by software vendor A, whereas a different web proposition (e.g., a slots game) is delivered by a different vendor B and does not have that functionality. In contrast, with respect to some embodiments of the present invention, the flexibility and "sandboxing" of a client delivery system allows for common functions to be provided by a provider across a variety of services, games, websites, hardware devices, and jurisdictions, irrespective of what vendor or developer developed the plugins.

Although some non-limiting examples are discussed in this disclosure with respect to applications (e.g., on-line games) made available (e.g., by a gaming provider) to players of a gaming platform (e.g., via a game server), it will be readily understood that various embodiments discussed in this disclosure are not limited to such examples. Various features of a client delivery system, plugin certification system and/or plugin certification process may be implemented with respect to the development and/or distribution of applications for various different types of application systems and platforms (e.g., providing web applications to on-line users).

B. Terms and Definitions

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. While not generally limiting and while not limiting for all described embodiments, in some embodiments, the terms are specifically limited to the example definitions and/or examples provided. Other terms are defined throughout the present description.

The term "plugin", as used in this disclosure may refer to a separate application that runs or executes in its own (independent) process.

The term "CSS", as used in this disclosure, refers to cascading style sheets (CSS) that define formatting rules for web page content, in various manners well known in the relevant art. The style (e.g., color, font and/or spacing) of a web page element may be affected by CSS developed for a web page, by default styles of a browser, by CSS specificity (e.g., a methodology that gives different weights to particular kinds of CSS rules) and/or by the order of CSS rules. CSS formatting rules may comprise a CSS selector that defines, for example, a specificity for how CSS formatting is to be applied (e.g., to which type or types of web page elements).

The term "game provider", as used in this disclosure (unless specified otherwise), generally refers to (and in specific embodiments may be expressly limited to) an entity or system of components which provides games for play and facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate a gambling website over which wagers are accepted and results of wagering games are provided.

The term "venture", as used in this disclosure (unless specified otherwise), generally refers to (and in specific embodiments may be expressly limited to) a specific website, on-line game, and/or on-line game platform (e.g., provided by a game provider or other type of gaming entity). For example, a game provider may operate a first gambling website or venture that provides one or more types of games over the Internet. In another example, the game provider may operate a second gaming website (e.g., for a different jurisdiction than a first website) that provides one or more of the same games as the first website, and/or may provide one or more different games.

As utilized in this disclosure, the term "player" may generally refer to (and in specific embodiments may be expressly limited to) any type, quantity, and or manner of entity associated with the play of a game. In some embodiments, a player may comprise an entity conducting play of an online game, for example, may comprise an entity that desires to play a game (e.g., an entity registered and/or scheduled to play and/or an entity having expressed interest in the play of the game—e.g., a spectator) and/or may comprise an entity that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game). In some embodiments, a player may comprise an individual (or group) that enters, joins, logs into, registers for, and/or otherwise access an online game room, session, server, and/or other particular instance and/or segmentation of an online game.

Some embodiments described in this disclosure are associated with a "player device," a "user device" and/or a "network device". As used in this disclosure, a "player device" and a "user device" are examples of a "network device". The "network device", for example, may generally refer to any device that can communicate via a network, while the "player device" may comprise a network device that is owned and/or operated by or otherwise associated with a player. Examples of player, user and/or network devices may include, but are not limited to: a PC, a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

As used in this disclosure, the term "network component" may refer to a player or network device, or a component, piece, portion, or combination of player or network devices. Examples of network components may include a Static Random Access Memory (SRAM) device or module, a network processor, and a network communication path, connection, port, or cable.

In addition, some embodiments are associated with a "network" or a "communication network." As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration or type that is or becomes known. Communication networks may include, for example, devices that communicate directly or indirectly, via a wired or wireless medium such as the Internet, intranet, a Local Area Network (LAN), a Wide Area Network (WAN), a cellular telephone network, a Bluetooth® network, a Near-Field Communication (NFC) network, a Radio Frequency (RF) network, a Virtual Private Network (VPN), Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), and/or system to system (S2S).

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard. Information may, according to some embodiments, be compressed, encoded, encrypted, and/or otherwise packaged or manipulated in accordance with any method that is or becomes known or practicable.

The term "indication", as used in this disclosure (unless specified otherwise), may generally refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

C. General Systems and Structures

Turning first to FIG. 1, a block diagram of a system 100 according to some embodiments is shown. In some embodiments, the system 100 may comprise a gaming platform such as a gaming platform via which one or more multiplayer and/or online games may be played (e.g., one or more slot-style games as described herein). In some embodiments, the system 100 may comprise a plurality of player devices 102a-n in communication with and/or via a network 104. In some embodiments, a game server 110 may be in communication with the network 104 and/or one or more of the player devices 102a-n. In some embodiments, the game server 110 (and/or the player devices 102a-n) may be in communication with a database 140. The database 140 may store, for example, game data (e.g., processed and/or defined by the game server 110), data associated with players (not explicitly shown) owning and/or operating the player devices 102a-n, and/or instructions that cause various devices (e.g., the game server 110 and/or the player devices 102a-n) to operate in accordance with embodiments described herein.

According to some embodiments, any or all of the components 102a-n, 104, 110, 140 of the system 100 may be similar in configuration and/or functionality to any similarly named and/or numbered components described herein. Fewer or more components 102a-n, 104, 110, 140 (and/or portions thereof) and/or various configurations of the components 102a-n, 104, 110, 140 may be included in the system 100 without deviating from the scope of embodiments described herein. While multiple instances of some components 102a-n are depicted and while single instances of other components 104, 110, 140 are depicted, for example, any component 102a-n, 104, 110, 140 depicted in the system 100 may comprise a single device, a combination of devices and/or components 102a-n, 104, 110, 140, and/or a plurality of devices, as is or becomes desirable and/or practicable. Similarly, in some embodiments, one or more of the various components 102a-n, 104, 110, 140 may not be needed and/or desired in the system 100.

The player devices 102a-n, in some embodiments, may comprise any type or configuration of electronic, mobile electronic, and or other network and/or communication devices (or combinations thereof) that are or become known or practicable. A first player device 102a may, for example, comprise one or more PC devices, computer workstations (e.g., game consoles and/or gaming computers), tablet computers, such as an iPad® manufactured by Apple®, Inc. of Cupertino, Calif., and/or cellular and/or wireless telephones such as an iPhone® (also manufactured by Apple®, Inc.) or an Optimus™ S smart phone manufactured by LG® Electronics, Inc. of San Diego, Calif., and running the Android® operating system from Google®, Inc. of Mountain View, Calif. In some embodiments, one or more of the player devices 102a-n may be specifically utilized and/or configured (e.g., via specially-programmed and/or stored instructions such as may define or comprise a software application) to communicate with the game server 110 (e.g., via the network 104).

The network 104 may, according to some embodiments, comprise a LAN, WAN, cellular telephone network, Bluetooth® network, NFC network, and/or RF network with communication links between the player devices 102a-n, the game server 110, and/or the database 140. In some embodiments, the network 104 may comprise direct communications links between any or all of the components 102a-n, 110, 140 of the system 100. The game server 110 may, for example, be directly interfaced or connected to the database 140 via one or more wires, cables, wireless links, and/or other network components, such network components (e.g., communication links) comprising portions of the network 104. In some embodiments, the network 104 may comprise one or many other links or network components other than those depicted in FIG. 1. A second player device 102b may, for example, be connected to the game server 110 via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 110, 140 of the system 100. The network 104 may comprise one or more cellular telephone networks with communication links between the player devices 102a-n and the game server 110, for example, and/or may comprise the Internet, with communication links between the player devices 102a-n and the database 140, for example.

According to some embodiments, the game server 110 may comprise a device (and/or system) owned and/or operated by or on behalf of or for the benefit of a gaming entity (not explicitly shown). The gaming entity may utilize player and/or game information or instructions (e.g., stored by the database 140), in some embodiments, to host, manage, analyze, design, define, price, conduct, and/or otherwise provide (or cause to be provided) one or more games such as online multiplayer games (e.g., one or more slot-style games as described herein). In some embodiments, the gaming entity (and/or a third-party; not explicitly shown) may provide an interface (not shown in FIG. 1) to and/or via the player devices 102a-n. The interface may be configured, according to some embodiments, to allow and/or facilitate electronic game play by one or more players. In some embodiments, the system 100 (and/or interface provided by the game server 110) may present game data (e.g., from the database 140) in such a manner that allows players to participate in one or more online games (singularly, in/with groups, and/or otherwise). According to some embodiments, the game server 110 may cause and/or facilitate various functionality and/or features of one or more slot-style games, each as described herein.

In some embodiments, the database 140 may comprise any type, configuration, and/or quantity of data storage devices that are or become known or practicable. The database 140 may, for example, comprise an array of optical and/or solid-state hard drives configured to store player and/or game data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the player devices 102*a-n* may comprise the database 140 or a portion thereof, for example, and/or the game server 110 may comprise the database 140 or a portion thereof.

According to some embodiments, any or all of the player devices 102*a-n* in conjunction with one or more of the game server 110 and/or the database 140 (e.g., via the network 104) may conduct (in whole or in part), facilitate, and/or otherwise be associated with execution of one or more stored procedures, applications, processes, and/or methods (and/or one or more portions and/or combinations thereof) as described in this disclosure.

Figure 2:
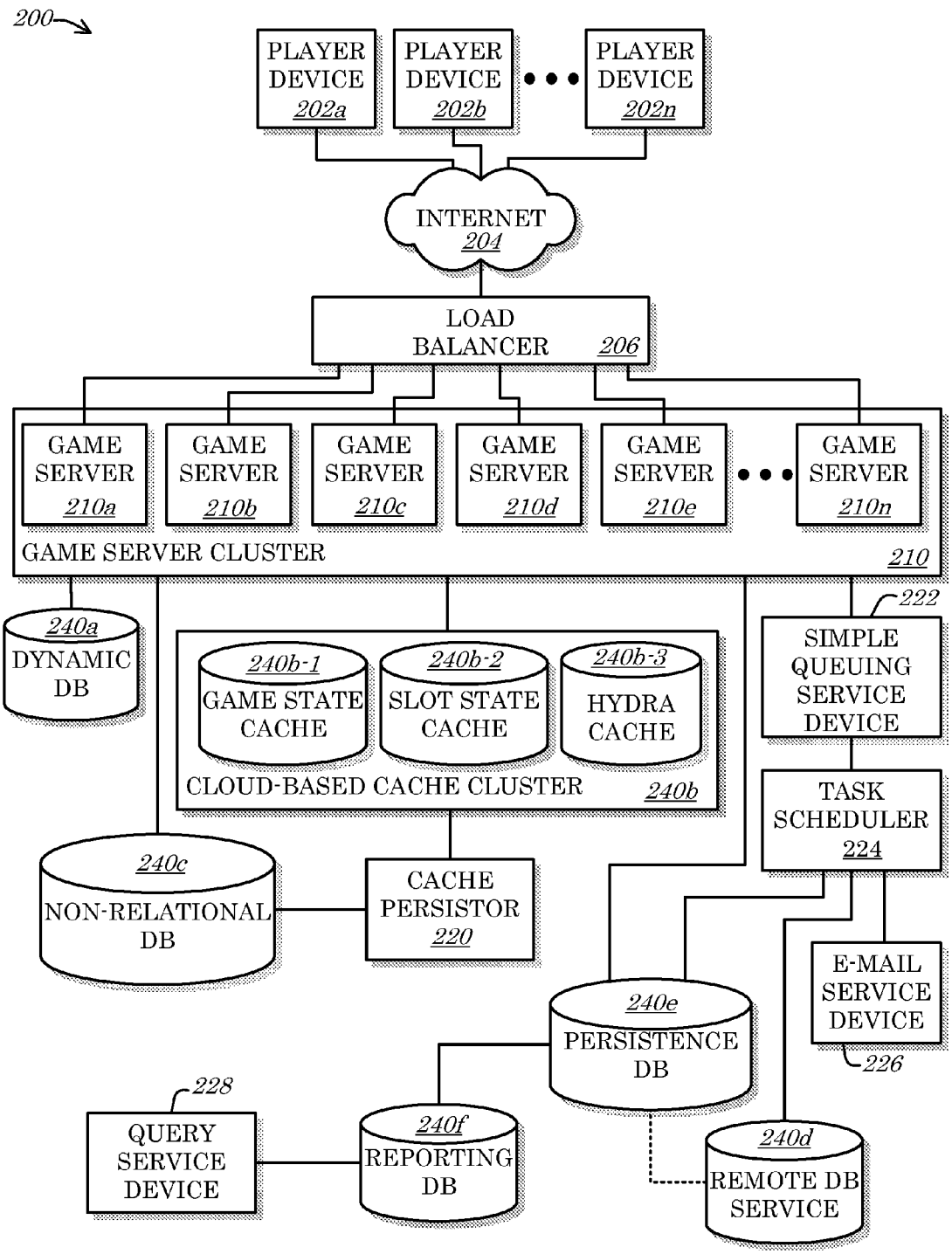
FIG. 2 is a block diagram of a system according to one or more embodiments.

Referring now to FIG. 2, a block diagram of a system 200 according to some embodiments is shown. In some embodiments, the system 200 may comprise a gaming platform such as a platform via which social, multiplayer, and/or online games may be played (e.g., one or more slot-style games as described herein). In some embodiments, the system 200 may comprise a plurality of player devices 202*a-n*, the Internet 204, a load balancer 206, and/or a game server cluster 210. The game server cluster 210 may, in some embodiments, comprise a plurality of game servers 210*a-n*. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202*a-n*, 204, 206, 210*a-n*, 220, 222, 224, 226, 228 may be in communication with and/or coupled to one or more databases 240*a-f*. The system 200 may comprise, for example, a dynamic DataBase (DB) 240*a*, a cloud-based cache cluster 240*b* (e.g., comprising a game state cache 240*b*-1, a slot state cache 240*b*-2, and/or a "hydra" cache 240*b*-3), a non-relational DB 240*c*, a remote DB service 240*d*, a persistence DB 240*e*, and/or a reporting DB 240*f*.

According to some embodiments, any or all of the components 202*a-n*, 204, 206, 210*a-n*, 220, 222, 224, 226, 228, 240*a-f* of the system 200 may be similar in configuration and/or functionality to any similarly named and/or numbered components described herein. Fewer or more components 202*a-n*, 204, 206, 210*a-n*, 220, 222, 224, 226, 228, 240*a-f* (and/or portions thereof) and/or various configurations of the components 202*a-n*, 204, 206, 210*a-n*, 220, 222, 224, 226, 228, 240*a-f* may be included in the system 200 without deviating from the scope of embodiments described herein. While multiple instances of some components 202*a-n*, 210*a-n*, 240*a-f* are depicted and while single instances of other components 204, 206, 220, 222, 224, 226, 228 are depicted, for example, any component 202*a-n*, 204, 206, 210*a-n*, 220, 222, 224, 226, 228, 240*a-f* depicted in the system 200 may comprise a single device, a combination of devices and/or components 202*a-n*, 204, 206, 210*a-n*, 220, 222, 224, 226, 228, 240*a-f*, and/or a plurality of devices, as is or becomes desirable and/or practicable. Similarly, in some embodiments, one or more of the various components 202*a-n*, 204, 206, 210*a-n*, 220, 222, 224, 226, 228, 240*a-f* may not be needed and/or desired in the system 200.

According to some embodiments, the player devices 202*a-n* may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slot-style games, poker, and/or other games of chance, skill, and/or combinations thereof. In some embodiments, the various game servers 210*a-n* (virtual and/or physical) of the game server cluster 210 may be configured to provide, manage, host, and/or conduct individual instances and/or sessions of available game types. A first game server 210*a*, for example, may host a first particular session of an online bingo game (or tournament), a second game server 210*c* may host a second particular session of an online bingo game (or tournament), a third game server 210*c* may facilitate an online poker tournament (e.g., and a corresponding plurality of game sessions that comprise the tournament), and/or a fourth game server 210*d* may provide an online slots game (e.g., by hosting one or more slot game sessions).

In some embodiments, the player devices 202*a-n* may comprise various components (hardware, firmware, and/or software; not explicitly shown) that facilitate game play and/or interaction with the game server cluster 210. The player device 202*a-n* may, for example, comprise a gaming client such as a software application programmed in Adobe® Flash® and/or HTML 5 that is configured to send requests to, and receive responses from, one or more of the game servers 210*a-n* of the game server cluster 210. In some embodiments, such an application operating on and/or via the player devices 202*a-n* may be configured in Model-View-Controller (MVC) architecture with a communication manager layer responsible for managing the requests to/responses from the game server cluster 210. In some embodiments, one or more of the game servers 210*a-n* may also or alternatively be configured in a MVC architecture with a communication manager and/or communications management layer (not explicitly shown in FIG. 2). In some embodiments, communications between the player devices 202*a-n* and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202*a-n* and the game server cluster 210 may be managed and/or facilitated by the load balancer 206. The load balancer 206 may, for example, route communications from player devices 202*a-n* to one or more of the specific game servers 210*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/"stickiness"). In some embodiments, the load balancer 206 may comprise one or more devices and/or services provided by a third-party (not separately shown in FIG. 2). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210*a-n* within the game server cluster 210. In the case that traffic and/or requests from the player devices 202*a-n* only require the first and second game servers 210*a-b*, for example, all other game servers 210*c-n* may be taken off-line, may not be initiated and/or called, and/or may otherwise not be required and/or utilized in the system 200. As demand increases (and/or if performance, security, and/or other issues cause one or more of the first and second game servers 210*a-b* to experience detrimental issues), the load balancer 206 may call and/or bring online one or more of the other game servers 210*c-n* depicted in FIG. 2. In the case that each game server 210*a-n* comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202*a-n* and the game server cluster 210 are conducted and/or routed. Such proxy servers and/or devices may comprise one or more regional game hosting centers, for example, which may be geographically dispersed and addressable by player devices 202*a-n* in a given geographic proximity. In some embodiments, the proxy servers and/or devices may be located in one or more geographic areas and/or jurisdictions while the game server cluster 210 (and/or certain game servers 210*a-n* and/or groups of game servers 210*a-n* thereof) is located in a separate and/or remote geographic area and/or jurisdiction.

According to some embodiments, for specific game types such as bingo, the game server cluster 210 may provide game results (such as a full set of drawn bingo numbers and/or bonus metrics) to a controller device (not separately shown in FIG. 2) that times the release of game result information to the player devices 202*a-n* such as by utilizing a broadcaster device (also not separately shown in FIG. 2) that transmits the time-released game results to the player devices 202*a-n* (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210*a-n* thereof) may be in communication with the dynamic DB 240*a*. According to some embodiments, the dynamic DB 240*a* may comprise a dynamically-scalable database service such as the DyanmoDB™ service provided by Amazon® Web Services, LLC. The dynamic DB 240*a* may, for example, store information specific to one or more certain game types (e.g., slot-style games) provided by the game server cluster 210 such as to allow, permit, and/or facilitate reporting and/or analysis of such information.

According to some embodiments, the game server cluster 210 (and/or one or more of the game servers 210*a-n* thereof) may be in communication with the cloud-based cache cluster 240*b*. Game state information from the game server cluster 210 may be stored in the game state cache 240*b*-1, for example, slot state (e.g., slot-game specific state) data may be stored in the slot state cache 240*b*-2, and/or other game and/or player information (e.g., progressive data, referral data, player rankings, audit data) may be stored in the hydra cache 240*b*-3. In some embodiments, the cache persistor 220 may move and/or copy data stored in the cloud-based cache cluster 240*b* to the non-relational DB 240*c*. The non-relational DB 240*c* may, for example, comprise a SimpleDB™ service provided by Amazon® Wed Services, LLC. According to some embodiments, the game server cluster 210 may generally access the cloud-based cache cluster 240*b* as-needed to store and/or retrieve game-related information. The data stored in the cloud-based cache cluster 240*b* may generally comprise a subset of the newest or freshest data, while the cache persistor 220 may archive and/or store or move such data to the non-relational DB 240*c* as it ages and/or becomes less relevant (e.g., once a player logs-off, once a game session and/or tournament ends). The game server cluster 210 may, in accordance with some embodiments, have access to the non-relational DB 240*c* as-needed and/or desired. The game servers 210*a-n* may, for example, be initialized with data from the non-relational DB 240*c* and/or may store and/or retrieve low frequency and/or low priority data via the non-relational DB 240*c*.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240*d* (e.g., providing inserts and/or updates), and/or the persistence DB 240*e* (e.g., providing and/or updating game, player, and/or other reporting data), e.g., in accordance with one or more schedules.

According to some embodiments, the persistence DB 240*e* may comprise a data store of live environment game and/or player data. The game server cluster 210 and/or the task scheduler 224 or SQS device 222 may, for example, store game and/or player data to the persistence DB 240*e* and/or may pull and/or retrieve data from the persistence DB 240*e*, as-needed and/or desired. The server cluster 210 may, according to some embodiments, provide and/or retrieve spin and/or other game event info and/or configuration information via the persistence DB 240*e*.

In some embodiments, the reporting DB 240*f* may be created and/or populated based on the persistence DB 240*e*. On a scheduled and/or other basis, for example, a data transformation and/or mapping program may be utilized to pull data from the live environment (e.g., the persistence DB 240*e*) into the reporting DB 240*f*. The query service 228 may then be utilized, for example, to query the reporting DB 240*f*, without taxing the live environment and/or production system directly accessible by the game server cluster 210.

According to some embodiments, any or all of the player devices 202*a-n* in conjunction with one or more of the game servers 210*a-n* and/or the databases 240*a-f* (e.g., via the network 204) may conduct (in whole or in part), facilitate, and/or otherwise be associated with execution of one or more stored procedures, applications, processes, and/or methods (and/or one or more portions and/or combinations thereof) as described herein.

Figure 3:
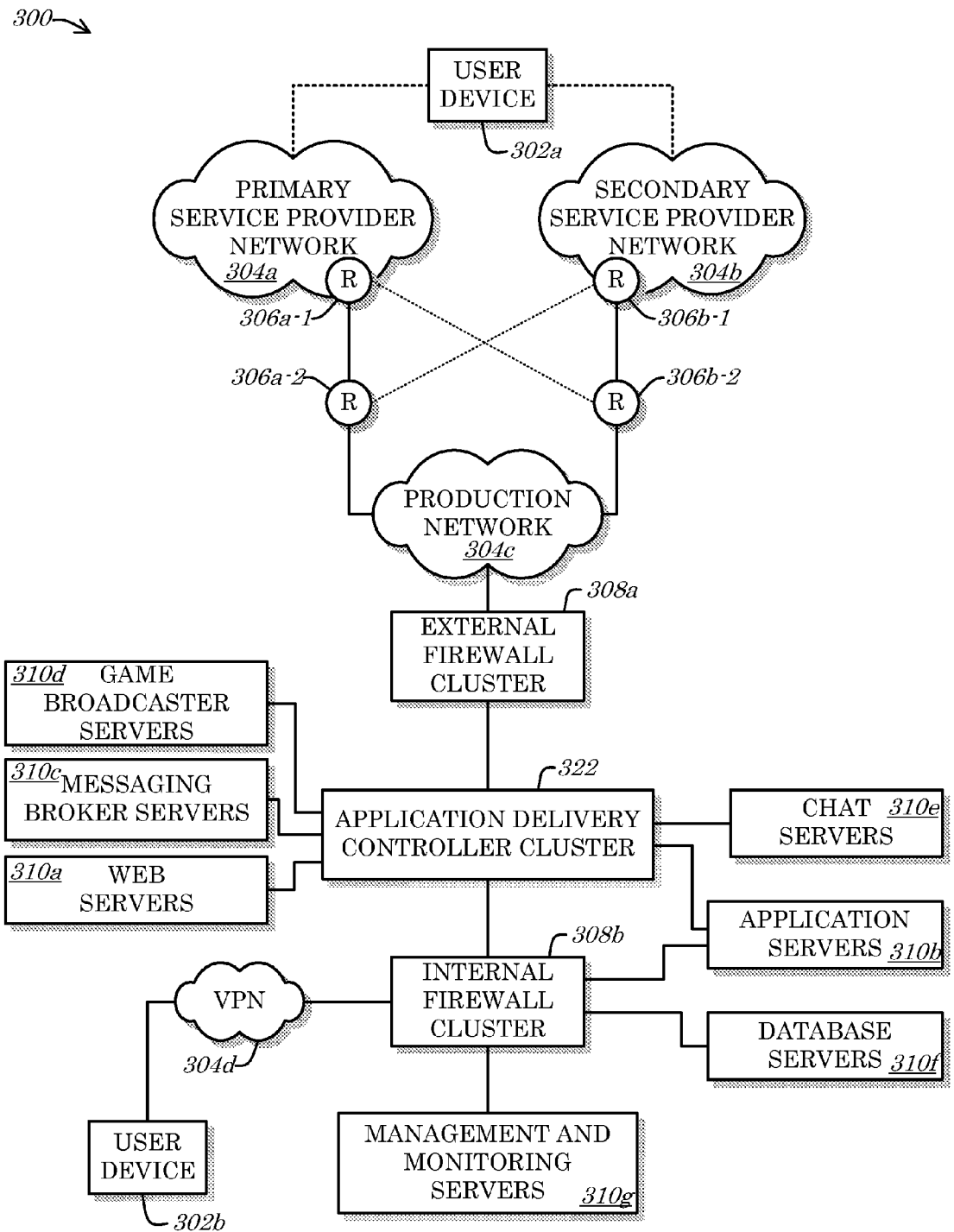
FIG. 3 is a block diagram of a system according to one or more embodiments.

Turning now to FIG. 3, a block diagram of a system 300 according to some embodiments is shown. In some embodiments, the system 300 may comprise and/or define a "front-end" architecture of a gaming platform such as a platform via which social, multiplayer, and/or online games may be played (e.g., one or more slot-style games as described herein). In some embodiments, the system 300 may comprise a plurality of user devices 302*a-b*, a plurality of networks 304*a-b* (e.g., a primary service provider network 304*a*, a secondary service provider network 304*b*, a production network 304*c*, and/or a VPN 304*d*), a plurality of routers 306*a-b*, a plurality of firewall devices 308*a-b*, a plurality of game servers 310*a-g* (e.g., web servers 310*a*, application servers 310*b*, messaging broker servers 310*c*, game broadcaster servers 310*d*, chat servers 310*e*, database servers 310*f*, and/or management and monitoring servers 310*g*), and/or an application delivery controller cluster 322.

According to some embodiments, any or all of the components 302*a*-*b*, 304*a*-*b*, 306*a*-*b*, 308*a*-*b*, 310*a*-*g*, 322 of the system 300 may be similar in configuration and/or functionality to any similarly named and/or numbered components described herein. Fewer or more components 302*a*-*b*, 304*a*-*b*, 306*a*-*b*, 308*a*-*b*, 310*a*-*g*, 322 (and/or portions thereof) and/or various configurations of the components 302*a*-*b*, 304*a*-*b*, 306*a*-*b*, 308*a*-*b*, 310*a*-*g*, 322 may be included in the system 300 without deviating from the scope of embodiments described herein. While multiple instances of some components 302*a*-*b*, 304*a*-*b*, 306*a*-*b*, 308*a*-*b*, 310*a*-*g* are depicted and while single instances of other components 322 are depicted, for example, any component 302*a*-*b*, 304*a*-*b*, 306*a*-*b*, 308*a*-*b*, 310*a*-*g*, 322 depicted in the system 300 may comprise a single device, a combination of devices and/or components 302*a*-*b*, 304*a*-*b*, 306*a*-*b*, 308*a*-*b*, 310*a*-*g*, 322, and/or a plurality of devices, as is or becomes desirable and/or practicable. Similarly, in some embodiments, one or more of the various components 302*a*-*b*, 304*a*-*b*, 306*a*-*b*, 308*a*-*b*, 310*a*-*g*, 322 may not be needed and/or desired in the system 300.

In some embodiments, a first user device 302*a* may comprise an electronic device owned and/or operated by a player of an online game (not explicitly shown) and/or by an entity that otherwise accesses online game content and/or services externally (e.g., requiring external login and/or access credentials and/or procedures). The first user device 302*a* may, for example, be utilized to access content provided by and/or via the application delivery controller cluster 322. In some embodiments, the first user device 302*a* may interface with and/or connect to the production network 304*c* via the primary service provider network 304*a* and/or the secondary service provider network 304*b*. The primary service provider network 304*a* and the secondary service provider network 304*b* may, for example, load balance and/or provide redundant coverage for outage recovery by utilization of a first primary service provider network router 306*a*-1, a second primary service provider network router 306*a*-2, a first secondary service provider network router 306*b*-1, and/or a second secondary service provider network router 306*b*-2.

According to some embodiments, the application delivery controller cluster 322 may be insulated and/or protected from the production network 304*c* by an external firewall cluster 308*a*. The first user device 302*a* may, for example, be required to provide credentials to and/or otherwise access the application delivery controller cluster 322 via the external firewall cluster 308*a*.

In some embodiments, the application delivery controller cluster 322 may receive via and/or from the external firewall cluster 308*a* and/or the production network 304*c*, one or more requests, calls, transmissions, and/or commands from the first user device 302*a*. The first user device 302*a* may, for example, submit a call for an online gaming interface to the application delivery controller cluster 322. In some embodiments, the application delivery controller cluster 322 may comprise one or more hardware, software, and/or firmware devices and/or modules configured (e.g., specially-programmed) to route events and/or responses between the first user device 302*a* and one or more of the servers 310*a*-*g*. In the case that the first user device 302*a* is utilized to access an online gaming interface for example, one or more of the web servers 310*a* (e.g., that may provide graphical and/or rendering elements for an interface and/or other web services) and/ or the application servers 310*b* (e.g., that may provide rule and/or logic-based programming routines, elements, and/or functions—e.g., game play engines) may be called and/or managed by the application delivery controller cluster 322.

In some embodiments, the messaging broker servers 310*c* may receive and/or retrieve messages from the first user device 302*a* (and/or from one or more of the other servers 310*a*-*b*, 310*d*-*g*) and perform one or more inter-application processes in relation thereto. The messaging broker servers 310*c* may, for example, route, transform, consolidate, aggregate, store, augment, and/or otherwise process one or more requests in connection with provision of online gaming services to the first user device 302*a* (e.g., facilitating a decoupling of services provided by various applications on and/or from the various servers 310*a*-*b*, 310*d*-*g*). According to some embodiments, the game broadcaster servers 310*d* may provide scheduled releases of information descriptive of an online game. The game broadcaster servers 310*d* may, for example, provide a broadcast feed of bingo numbers, slot and/or other random (and/or pseudo-random) number results that may be accessed by (and/or transmitted to) the first user device 302*a* (e.g., in connection with the play of an online bingo, slots, and/or other game for which broadcast information may be utilized). In some embodiments, the chat servers 310*e* may provide, manage, and/or facilitate communications between the first user device 302*a* (and/or first user thereof) and one or more other player/user devices (such as a second user device 302*b* and/or other player/user devices not shown in FIG. 3).

According to some embodiments, the second user device 302*b* may generally comprise an electronic device owned and/or operated by a user (not shown) closely affiliated with an entity that operates the system 300 (such entity also not shown). An employee (e.g., programmer and/or Customer Service Representative (CSR)), contractor, and/or other agent of an online gaming company may, for example, utilize the second user device 302*b* to interface with the privately-accessible VPN 304*d*. The VPN 304*d* may, for example, provide direct access to the application servers 310*b*, the database servers 310*f*, the management and monitoring servers 310*g*, and/or the application delivery controller cluster 322. In some embodiments (as depicted in FIG. 3), such access may be gated through and/or insulated or protected by an internal firewall cluster 308*b*. The second user device 302*b* may, for example, be required to provide credentials to and/or otherwise access the application delivery controller cluster 322 and/or servers 310*a*-*g* via the internal firewall cluster 308*b*.

In some embodiments, the database servers 310*f* may provide access to one or more databases and/or data stores (e.g., not shown in FIG. 3; for data storage and/or retrieval). In some embodiments, the management and monitoring servers 310*g* may provide services such as monitoring, reporting, troubleshooting, analysis, configuring, etc. to the second user device 302*b*. The second user device 302*b* may, for example, access the management and monitoring servers 310*g* and/or the database servers 310*f* to run reports descriptive of online gaming operations, game play, and/or game referral setup, management, and/or analysis. According to some embodiments, either or both of the user devices 302*a*-*b* in conjunction with one or more of the servers 310*a*-*g* and/or the application delivery controller cluster 322 may conduct (in whole or in part), facilitate, and/or otherwise be associated with execution of one or more stored procedures, applications, processes, and/or methods (and/or one or more portions and/ or combinations thereof).

Utilization of the term "server" with respect to the servers 310*a*-*g* of the system 300 of FIG. 3 is meant solely to ease description of the configuration and/or functionality of the servers 310*a*-*g*. The term "server" is not intended to be limiting with respect to any particular hardware, software, firmware, and/or quantities thereof utilized to implement any or all of the servers 310a-g of the system 300. Similarly, while multiple types and/or instances of the servers 310a-g are depicted in FIG. 3, any or all of the servers 310a-g may be implemented in, on, and/or by one or multiple computer server and/or other electronic devices.

Figure 4:
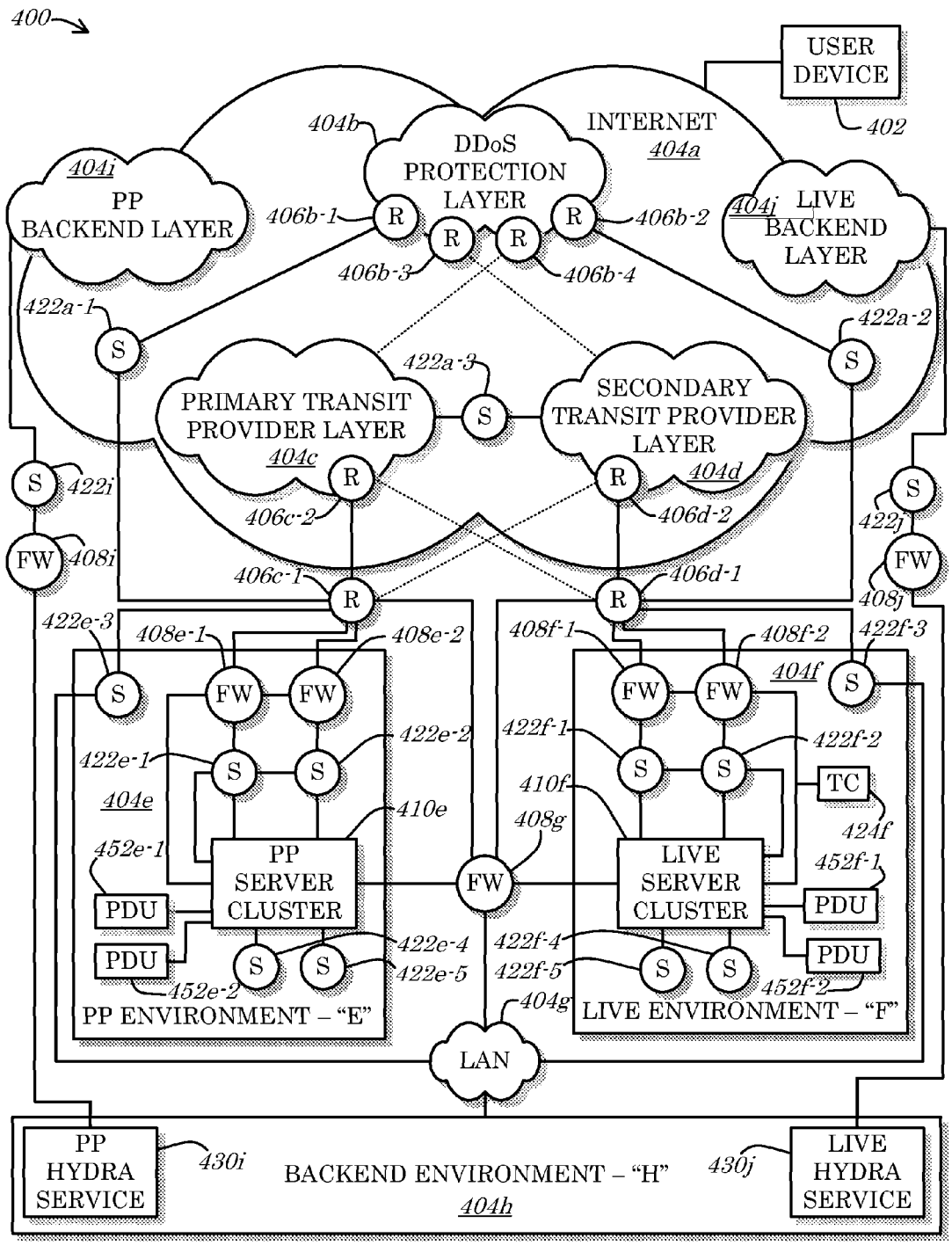
FIG. 4 is a block diagram of a system according to one or more embodiments.

Referring now to FIG. 4, a block diagram of a system 400 according to some embodiments is shown. In some embodiments, the system 400 may comprise and/or define a "front-end" architecture of a gaming platform such as a platform via which social, multiplayer, and/or online games may be played (e.g., one or more slot-style games as described herein). The system 400 may be similar in configuration and/or functionality, for example, to the system 300 of FIG. 3 and/or one or more portions thereof. In some embodiments, the system 400 may comprise a user device 402, a plurality of networks (and/or environments and/or layers) 404a-j (e.g., the Internet 404a, a Distributed Denial-of-Service (DDoS) protection layer 404b, a primary transit provider layer 404c, a secondary transit provider layer 404d, a Pre-Production (PP) environment 404e, a live environment 404f, a LAN 404g, a backend environment 404h, a PP backend layer 404i, and/or a live backend layer 404j), a plurality of routers 406b-d, a plurality of firewall devices 408e-g, 408i-j, a plurality of servers 410e-f (e.g., a PP server cluster 410e and/or a live server cluster 410f), a plurality of switching devices 422a, 422e-f, 422i-j, a Terminal Concentrator (TC) 424f, a plurality of "hydra" services 430i-j (e.g., a PP hydra service 430i and/or a live hydra service 430j), and/or a plurality of Power Distribution Unit (PDU) devices 452e-f.

According to some embodiments, any or all of the components 402, 404a-j, 406b-d, 408e-g, 408i-j, 410e-f, 422a, 422e-f, 422i-j, 424f, 430i-j, 452e-f of the system 400 may be similar in configuration and/or functionality to any similarly named and/or numbered components described herein. Fewer or more components 402, 404a-j, 406b-d, 408e-g, 408i-j, 410e-f, 422a, 422e-f, 422i-j, 424f, 430i-j, 452e-f (and/or portions thereof) and/or various configurations of the components 402, 404a-j, 406b-d, 408e-g, 408i-j, 410e-f, 422a, 422e-f, 422i-j, 424f, 430i-j, 452e-f may be included in the system 400 without deviating from the scope of embodiments described herein. While multiple instances of some components 404a-j, 406b-d, 408e-g, 408i-j, 410e-f, 422a, 422e-f, 422i-j, 430i-j, 452e-f are depicted and while single instances of other components 402, 424f are depicted, for example, any component 402, 404a-j, 406b-d, 408e-g, 408i-j, 410e-f, 422a, 422e-f, 422i-j, 424f, 430i-j, 452e-f depicted in the system 400 may comprise a single device, a combination of devices and/or components 402, 404a-j, 406b-d, 408e-g, 408i-j, 410e-f, 422a, 422e-f, 422i-j, 424f, 430i-j, 452e-f, and/or a plurality of devices, as is or becomes desirable and/or practicable. Similarly, in some embodiments, one or more of the various components 402, 404a-j, 406b-d, 408e-g, 408i-j, 410e-f, 422a, 422e-f, 422i-j, 424f, 430i-j, 452e-f may not be needed and/or desired in the system 400.

In some embodiments, the user device 402 may be utilized to access one or more of the PP environment 404e, the live environment 404f, and/or the backend environment 404h via the Internet 404a. In some embodiments, the user device 402 may be utilized to access the backend environment 404h and/or the PP hydra service 430i via the PP backend layer 404i. A PP backend switch device 422i and/or a PP backend firewall device 408i may, for example, gate and/or control access to the backend environment 404h and/or the PP hydra service 430i, via the PP backend layer 404i. In some embodiments, the user device 402 may be utilized to access the backend environment 404h and/or the live hydra service 430j via the live backend layer 404j. A live backend switch device 422j and/or a live backend firewall device 408j may, for example, gate and/or control access to the backend environment 404h and/or the live hydra service 430j, via the live backend layer 404j.

According to some embodiments, any communications (e.g., requests, calls, and/or messages) from the user device 402 may be passed through the DDoS protection layer 404b. The DDoS protection layer 404b may, for example, monitor and/or facilitate protection against various forms of cyber attacks including, but not limited to, DDoS attacks. In some embodiments, the DDoS protection layer 404b may comprise and/or be in communication with a plurality of DDoS router devices 406b-1, 406b-2, 406b-3, 406b-4 that may be utilized to route and/or direct incoming communications (e.g., from the user device 402) to appropriate portions of the system 400.

In some embodiments, the DDoS protection layer 404b and/or a first DDoS router device 406b-1 may route communications from the user device 402 through and/or via a first switch device 422a-1 and/or to, through, and/or via a first primary transit provider router device 406c-1. In some embodiments, the first switch device 422a-1 may comprise a device utilized for security switching such as may implement communications in accordance with the Generic Routing Encapsulation (GRE) communications tunneling protocol described in RFC 2784 "Generic Routing Encapsulation (GRE)" published by the Network Working Group (NWG) in March, 2000. The first primary transit provider router device 406c-1 may, for example, provide access to the PP environment 404e and/or the PP server cluster 410e thereof, such as via one or more PP firewall devices 408e-1, 408e-2 and/or one or more PP switch devices 422e-1, 422e-2. According to some embodiments, the PP switch devices 422e-1, 422e-2 may comprise content switching devices that process and route data (e.g., in the data link layer) based on data content. In some embodiments, the first primary transit provider router device 406c-1 may direct communications to, through, and/or via a PP LAN switch device 422e-3 that provides and/or facilitates access to the LAN 404g. The LAN 404g may, for example, provide private access to and/or between the PP environment 404e, the live environment 404f, and/or the backend environment 404h. In some embodiments, the first primary transit provider router device 406c-1 and/or the PP LAN switch device 422e-3 may direct communications to, through, and/or via a LAN firewall device 408g that provides direct access to either or both of the PP server cluster 410e and the live server cluster 410f.

According to some embodiments, the DDoS protection layer 404b and/or a second DDoS router device 406b-2 may route communications from the user device 402 through and/or via a second switch device 422a-2 and/or to, through, and/or via a first secondary transit provider router device 406d-1. In some embodiments, the second switch device 422a-2 may comprise a device utilized for security switching such as may implement communications in accordance with the GRE communications tunneling protocol described in RFC 2784 "Generic Routing Encapsulation (GRE)" published by the Network Working Group (NWG) in March, 2000. The first secondary transit provider router device 406d-1 may, for example, provide access to the live environment 404f and/or the live server cluster 410f thereof, such as via one or more live firewall devices 408f-1, 408f-2 and/or one or more live switch devices 422f-1, 422f-2. According to some embodiments, the live switch devices 422f-1, 422f-2 may comprise content switching devices that process and route data (e.g., in the data link layer) based on data content.

In some embodiments, the first secondary transit provider router device 406d-1 may direct communications to, through, and/or via a live LAN switch device 422f-3 that provides and/or facilitates access to the LAN 404g. In some embodiments, the first secondary transit provider router device 406d-1 and/or the live LAN switch device 422f-3 may direct communications to, through, and/or via the LAN firewall device 408g that provides direct access to either or both of the PP server cluster 410e and the live server cluster 410f.

In some embodiments, the DDoS protection layer 404b and/or one or more of a third DDoS router device 406b-3 and/or a fourth DDoS router device 406b-4 may route communications from the user device 402 through and/or via one or more of the primary transit provider layer 404c and/or the secondary transit provider layer 404d. In some embodiments, a transit provider switch device 422a-3 may direct, swap, route, and/or manage communications between the primary transit provider layer 404c and the secondary transit provider layer 404d. According to some embodiments, the transit provider switch device 422a-3 may comprise a switching device that operates in accordance with an Exterior Border Gateway Protocol (EBGP)—e.g., the transit provider switch device 422a-3 may comprise one or more edge or border routers. In some embodiments, the first primary transit provider router device 406c-1, the first secondary transit provider router device 406d-1, a second primary transit provider router device 406c-2, and/or a second secondary transit provider router device 406d-2 may be utilized to route and/or direct communications between (i) the primary transit provider layer 404c and/or the secondary transit provider layer 404d and (ii) the PP environment 404e and/or the live environment 404f.

According to some embodiments, the PP server cluster 410e and/or the PP environment 404e may comprise various hardware, software, and/or firmware that permits a user (e.g., of the user device 402) to program, edit, manage, and/or otherwise interface with PP game elements and/or interfaces (e.g., for development and/or testing purposes). In some embodiments, the PDU devices 452e-1, 452e-2 may generally provide power distribution, supply, management, backup, and/or conditioning services (e.g., to the PP server cluster 410e) as is or becomes desired. According to some embodiments, additional switch devices 422e-4, 422e-5 may be utilized to distribute, balance, manage and/or control communications to, from, and/or within the PP server cluster 410e.

In some embodiments, the live server cluster 410f and/or the live environment 404f may comprise various hardware, software, and/or firmware that permits a user (e.g., of the user device 402) to program, edit, manage, and/or otherwise interface with live game elements and/or interfaces (e.g., for troubleshooting, corrective, and/or live environment management purposes). In some embodiments, the PDU devices 452f-1, 452f-2 may generally provide power distribution, supply, management, backup, and/or conditioning services (e.g., to the live server cluster 410f) as is or becomes desired. According to some embodiments, additional switch devices 422f-4, 422f-5 may be utilized to distribute, balance, manage and/or control communications to, from, and/or within the live server cluster 410f. In some embodiments, the TC device 424f may be utilized to manage communications from a variety of data sources such as by providing communication capability between various communications channels (not separately depicted in FIG. 4).

According to some embodiments, the user device 402 in conjunction with the live server cluster 410f (e.g., via the Internet 404a) may conduct (in whole or in part), facilitate, and/or otherwise be associated with execution of one or more stored procedures, applications, processes, and/or methods (and/or one or more portions and/or combinations thereof) as described herein.

Figure 5:
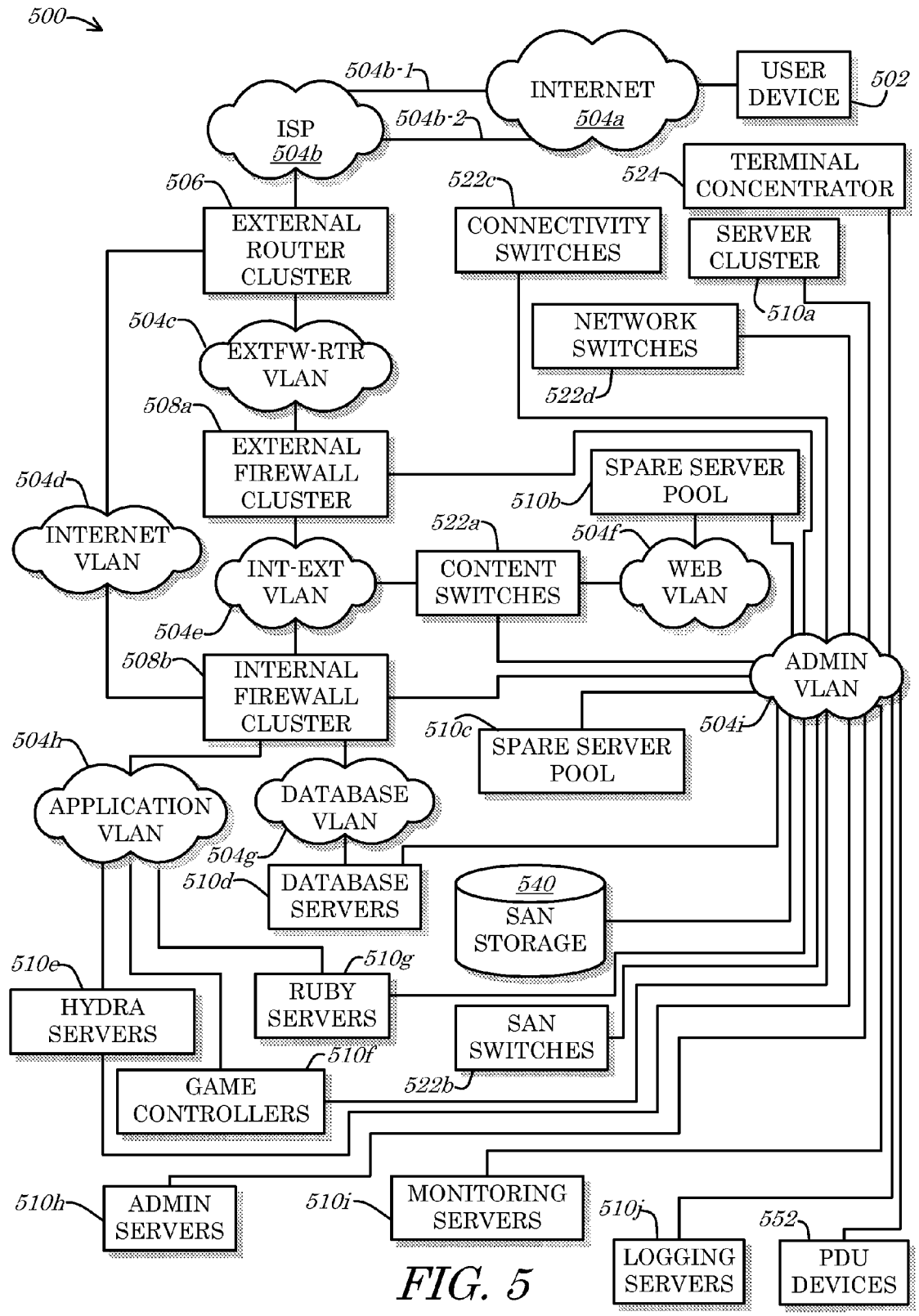
FIG. 5 is a block diagram of a system according to one or more embodiments.

Turning to FIG. 5, a block diagram of a system 500 according to some embodiments is shown. In some embodiments, the system 500 may comprise and/or define a "back-end" architecture of a gaming platform such as a platform via which social, multiplayer, and/or online games may be played (e.g., one or more slot-style games as described herein). The system 500 may be utilized in conjunction with the systems 300, 400 if FIG. 3 and/or FIG. 4 herein, for example, and/or may be similar in configuration and/or functionality to the backend environment 404h of the system 400 of FIG. 4. In some embodiments, the system 500 may comprise a user device 502, a plurality of networks (and/or environments and/or layers) 504a-i (e.g., the Internet 504a, an ISP 504b, an External Firewall-Router (EXTFW-RTR) Virtual LAN (VLAN) 504c, an Internet VLAN 504d, an Internal-External (INT-EXT) VLAN 504e, a web VLAN 504f, a database VLAN 504g, an application VLAN 504h, and/or an administrator VLAN 504i), an external router cluster 506, a plurality of firewall clusters 508a-b (e.g., an external firewall cluster 508a and/or an internal firewall cluster 508b), a plurality of servers 510a-j (e.g., a server cluster 510a, a first spare server pool 510b, a second spare server pool 510c, database servers 510d, "hydra" servers 510e, game controllers 510f, ruby servers 510g, admin servers 510h, monitoring servers 510i, and/or logging servers 510j), a plurality of switches 522a-d (e.g., content switches 522a, Storage Area Network (SAN) switches 522b, connectivity switches 522c, and/or network switches 522d), a TC device 524, a SAN storage device 540, and/or one or more PDU devices 552.

According to some embodiments, any or all of the components 502, 504a-l, 506, 508a-b, 510a-j, 522a-d, 524, 540, 552 of the system 500 may be similar in configuration and/or functionality to any similarly named and/or numbered components described herein. Fewer or more components 502, 504a-l, 506, 508a-b, 510a-j, 522a-d, 524, 540, 552 (and/or portions thereof) and/or various configurations of the components 502, 504a-l, 506, 508a-b, 510a-j, 522a-d, 524, 540, 552 may be included in the system 500 without deviating from the scope of embodiments described herein. While multiple instances of some components 504a-l, 508a-b, 510a-j, 522a-d are depicted and while single instances of other components 502, 506, 524, 540, 552 are depicted, for example, any component 502, 504a-l, 506, 508a-b, 510a-j, 522a-d, 524, 540, 552 depicted in the system 500 may comprise a single device, a combination of devices and/or components 502, 504a-l, 506, 508a-b, 510a-j, 522a-d, 524, 540, 552, and/or a plurality of devices, as is or becomes desirable and/or practicable. Similarly, in some embodiments, one or more of the various components 502, 504a-l, 506, 508a-b, 510a-j, 522a-d, 524, 540, 552 may not be needed and/or desired in the system 500.

In some embodiments, the user device 502 may be utilized to access and/or interface with one or more of the servers 510a-j via the Internet 504a. In some embodiments, the Internet 502a may be linked to the ISP 504b via multiple (e.g., redundant) connectivity paths 504b-1, 504b-2 (e.g., for load balancing, security, and/or failure recovery). According to some embodiments, the ISP 504b may be in communication with (and/or comprise) the external router cluster 506. The external router cluster 506 may route certain requests, calls, and/or transmissions (and/or users—e.g., based on credentials and/or other information) through the EXTFW-RTR VLAN 504c and/or through the external firewall cluster 508a, for example, and/or may route certain requests, calls, and/or transmissions (and/or users—e.g., based on credentials and/or other information) through the Internet VLAN 504d and/or through the internal firewall cluster 508b.

In the case that a user (not shown) of the user device 502 comprises an online game player, consumer, and/or other member of the public, for example, the external router cluster 506 may direct communications through the EXTFW-RTR VLAN 504c and/or through the external firewall cluster 508a. In the case that the user of the user device 502 comprises a programmer, tester, employee, and/or other agent of an entity that operates the system 500, for example, the external router cluster 506 may direct communications through the Internet VLAN 504d and/or through the internal firewall cluster 508b. In some embodiments, access via either or both of the external firewall cluster 508a and/or the internal firewall cluster 508b may permit the user device 502 to communicate via the INT-EXT VLAN 504e. The INT-EXT VLAN 504e may, for example, provide access to the content switches 522a which may, in some embodiments, serve content from any or all of the servers 510a-j to the user device 502, as is or becomes appropriate or desired. In some embodiments, the content switches 522a may communicate with the first spare server pool 510b via the web LAN 504f.

According to some embodiments, private and/or other specialized access to the system 500 via the internal firewall cluster 508b may permit the user device 502 to communicate via one or more of the database VLAN 504g, the application VLAN 504h, and/or the admin VLAN 504i. The database VLAN 504g may be utilized, for example, to access and/or communicate with the database servers 510d. In some embodiments, the application VLAN 504h may be utilized to access and/or communicate with any or all of the hydra servers 510e, the game controllers 510f, and/or the ruby servers 510g.

The admin VLAN 504i may allow, promote, conduct, facilitate, and/or manage a wide variety of communications within the system 500. The admin VLAN 504i may, for example, communicatively connect and/or couple any or all of the firewalls 508a-b, the servers 510a-j, the switches 522a-d, the TC device 524, the SAN storage 540, and/or the PDU devices 552. The user device 502 may be utilized, in conjunction with the admin servers 510h and/or via the admin VLAN 504i for example, to define, edit, adjust, manage, and/or otherwise access settings (and/or data) of the firewalls 508a-b, any or all of the switches 522a-d, the TC device 524, and/or the PDU devices 552. In some embodiments, the user device 502 (and/or the admin servers 510h) may be utilized to manage and/or access content, rules, settings, and/or performance characteristics or preferences for any or all of the servers 510a-j.

In some embodiments, the server cluster 510a may comprise one or more servers and/or other electronic controller devices (e.g., blade servers) configured to provide online gaming data (e.g., interfaces, outcomes, and/or results) to the user device 502. According to some embodiments, the first spare server pool 510b and/or the second spare server pool 510c may comprise one or more server and/or other electronic controller devices configured to supplement and/or replace the server cluster 510a as needed and/or desired (e.g., to manage load and/or error recovery situations). In some embodiments, the database servers 510c may provide and/or manage access to stored data such as data stored in and/or by the SAN storage device 540. In some embodiments, the hydra servers 510e and/or the game controllers 510f may provide online game information such as interfaces, results, graphics, sounds, and/or other media to the user device 502 (e.g., via the application VLAN 504h). In some embodiments, the ruby servers 510g may comprise one or more processing devices configured to provide access to one or more programming languages (e.g., "Ruby") and/or Application Programming Interface (API) mechanisms via which the servers 510a-j and/or other portions of the system 500 may be configured to operate (e.g., in accordance with specially and/or pre-programmed instructions written in the programming language and/or developed by the API provided by the ruby servers 510g). According to some embodiments, the admin servers 510h, the monitoring servers 510i, and/or the logging servers 510j may be utilized and/or configured to provide administrative, parameter and/or metric monitoring and/or reporting, and/or data logging and/or audit services, respectively.

According to some embodiments, the user device 502 in conjunction with one or more of the servers 510a-j (e.g., via the Internet 504a) may conduct (in whole or in part), facilitate, and/or otherwise be associated with execution of one or more stored procedures, applications, processes, and/or methods (and/or one or more portions and/or combinations thereof) as described herein.

Figure 6:
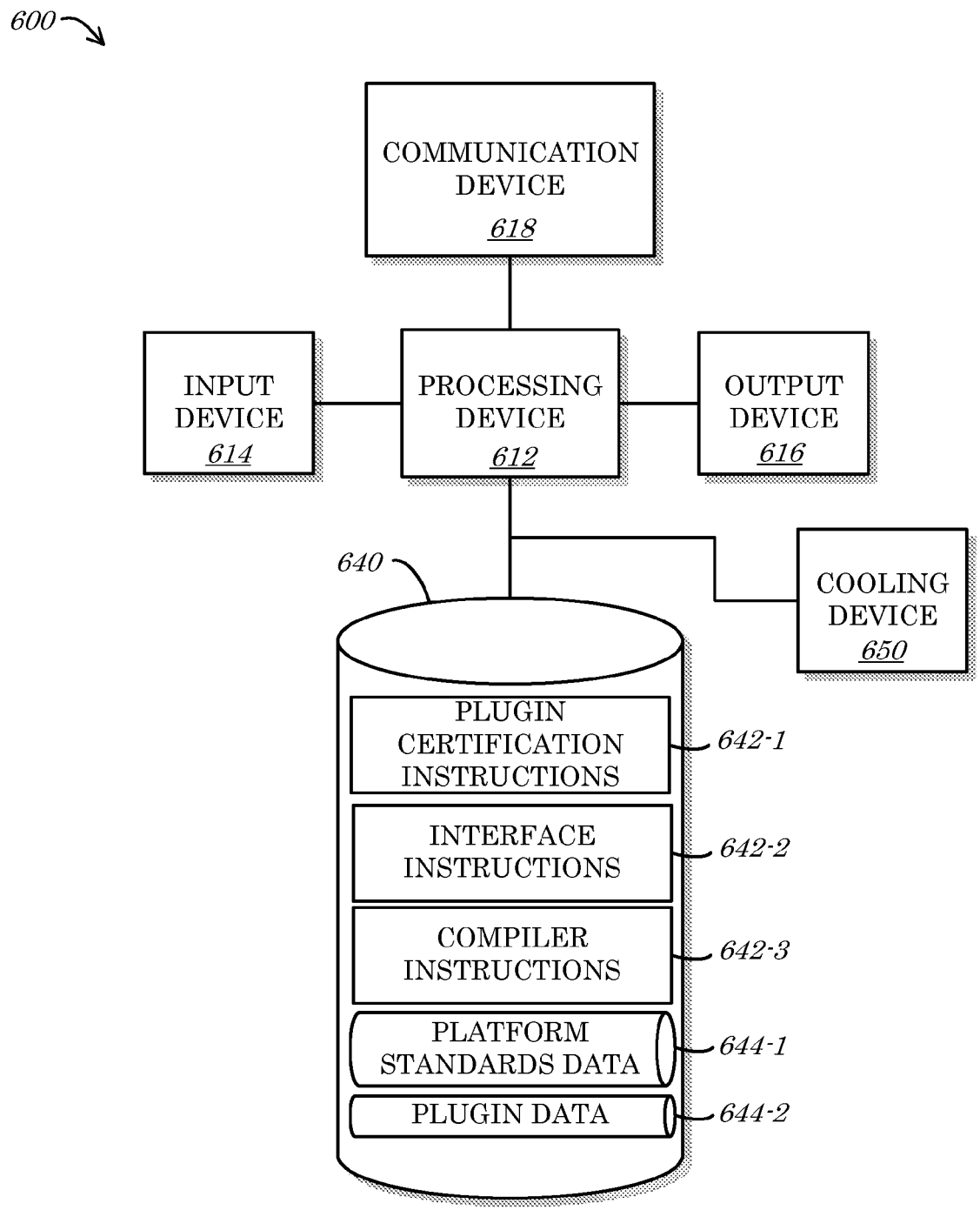
FIG. 6 is a block diagram of an apparatus according to one or more embodiments.

Turning to FIG. 6, a block diagram of an apparatus 600 according to some embodiments is shown. In some embodiments, the apparatus 600 may be similar in configuration and/or functionality to any of the user devices 302a-b, 402, 502, 702, the servers and/or controller devices 110, 210a-n, 310a-g, 322, 410e-f, 510a-j, the networks (and/or environments and/or layers) 404a-j, 706, 714, and/or may otherwise comprise a portion of the systems 100, 200, 300, 400, 500, 700, 800 of FIG. 1, FIG. 2, FIG. 3, FIG. 4, FIG. 5, FIG. 7 and/or FIG. 8 described in this disclosure. The apparatus 600 may, for example, execute, process, facilitate, and/or otherwise be associated with the methods (e.g., plugin certification processes) described in this disclosure.

In some embodiments, the apparatus 600 may comprise a processing device 612, an input device 614, an output device 616, a communication device 618, a memory device 640, and/or a cooling device 650. According to some embodiments, any or all of the components 612, 614, 616, 618, 640, 650 of the apparatus 600 may be similar in configuration and/or functionality to any similarly named and/or numbered components described herein. Fewer or more components 612, 614, 616, 618, 640, 650 and/or various configurations of the components 612, 614, 616, 618, 640, 650 may be included in the apparatus 600 without deviating from the scope of embodiments described herein.

According to some embodiments, the processing device 612 may be or include any type, quantity, and/or configuration of electronic and/or computerized processor that is or becomes known. The processing device 612 may comprise, for example, an Intel® IXP 2800 network processor or an Intel® XEON™ Processor coupled with an Intel® E7501 chipset. In some embodiments, the processing device 612 may comprise multiple inter-connected processors, microprocessors, and/or micro-engines. According to some embodiments, the processing device 612 (and/or the apparatus 600 and/or portions thereof) may be supplied power via a power supply (not shown) such as a battery, an Alternating Current (AC) source, a Direct Current (DC) source, an AC/DC adapter, solar cells, and/or an inertial generator. In the case that the apparatus 600 comprises a server such as a blade server, necessary power may be supplied via a standard AC outlet, power strip, surge protector, a PDU, and/or Uninterruptible Power Supply (UPS) device.

In some embodiments, the input device 614 and/or the output device 616 are communicatively coupled to the processing device 612 (e.g., via wired and/or wireless connections and/or pathways) and they may generally comprise any types or configurations of input and output components and/or devices that are or become known, respectively. The input device 614 may comprise, for example, a keyboard that allows an operator of the apparatus 600 to interface with the apparatus 600 (e.g., by a player, such as to participate in an online game session as described herein). In some embodiments, the input device 614 may comprise a sensor configured to provide information such as player relationships to the apparatus 600 and/or the processing device 612. The output device 616 may, according to some embodiments, comprise a display screen and/or other practicable output component and/or device. The output device 616 may, for example, provide a game interface (not explicitly shown in FIG. 6) to a player (e.g., via a website). According to some embodiments, the input device 614 and/or the output device 616 may comprise and/or be embodied in a single device such as a touchscreen monitor.

In some embodiments, the communication device 618 may comprise any type or configuration of communication device that is or becomes known or practicable. The communication device 618 may, for example, comprise a network interface card (NIC), a telephonic device, a cellular network device, a router, a hub, a modem, and/or a communications port or cable. In some embodiments, the communication device 618 may be coupled to provide data to a player device (not shown in FIG. 6), such as in the case that the apparatus 600 is utilized to provide a game interface to a player as described herein. The communication device 618 may, for example, comprise a cellular telephone network transmission device that sends signals indicative of game interface components to customer and/or subscriber handheld, mobile, and/or telephone device. According to some embodiments, the communication device 618 may also or alternatively be coupled to the processing device 612. In some embodiments, the communication device 618 may comprise an IR, RF, Bluetooth™, and/or Wi-Fi® network device coupled to facilitate communications between the processing device 612 and another device (such as a player device and/or a third-party device).

The memory device 640 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM).

The memory device 640 may, according to some embodiments, store one or more of plugin certification instructions 642-1, interface instructions 642-2 and/or compiler instructions 642-3. In some embodiments, the plugin certification instructions 642-1, interface instructions 642-2 and/or compiler instructions 642-3 may be utilized by the processing device 612 to provide output information via the output device 616 and/or the communication device 618.

According to some embodiments, the plugin certification instructions 642-1 and/or compiler instructions 642-3 may be operable to cause the processing device 612 to process platform standards data 644-1 and/or plugin data 644-2. In one or more embodiments, platform standards data 644-1 and/or plugin data 644-2 may be received, for example, via the input device 614 and/or the communication device 618 (e.g., from a user and/or user device in a pre-production or development environment).

In accordance with one or more embodiments, plugin data 644-2 (e.g., source code defining one or more plugins and/or other types of software application objects) may, for example, be analyzed, parsed, scored, checked for compliance and/or otherwise processed by the processing device 612, in accordance with the plugin certification instructions 642-1. In some embodiments, the plugin data 644-2 is processed by the processing device 612 in accordance with the plugin certification instructions 642-1 to determine whether one or more plugins specified by the plugin data 644-2 conform to one or more requirements, definitions, specifications, templates, standards, or the like, described in platform standards data 644-1. Plugins may be developed for use, for example, in an application development (pre-production) environment and/or platform production environment (and/or associated systems), such as for use in generating one or more web applications (e.g., for a gaming platform).

According to some embodiments, the compiler instructions 642-3 may be operable to cause the processing device 612 to compile source code of the plugin data 644-2, for example, to generate computer-executable software instructions (e.g., for web applications used in a production environment). In one or more embodiments, the compiler instructions 642-3 may comprise some or all of plugin certification instructions 642-1 and/or may include an instruction to execute plugin certification instructions 642-1 (e.g., as a part of a plugin certification process).

In some embodiments, the interface instructions 642-2 may be operable to cause the processing device 612 to facilitate receiving platform standards data 644-1, plugin data 644-2 and/or plugin certification instructions 642-1 (e.g., from a user and/or other computing device). In one or more embodiments, the interface instructions 642-2 may provide one or more user interfaces in accordance with embodiments described in this disclosure, such as, without limitation, displaying or otherwise transmitting information about plugins, plugin certification standards, indications of compliant and/or non-compliant plugins and/or results of a plugin certification process and/or compiling process.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 600. According to some embodiments, the memory device 640 may be incorporated into and/or otherwise coupled to the apparatus 600 (e.g., as shown) or may simply be accessible to the apparatus 600 (e.g., externally located and/or situated).

In some embodiments, the apparatus 600 may comprise a cooling device 650. According to some embodiments, the cooling device 650 may be coupled (physically, thermally, and/or electrically) to the processing device 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 600.

Figure 7:
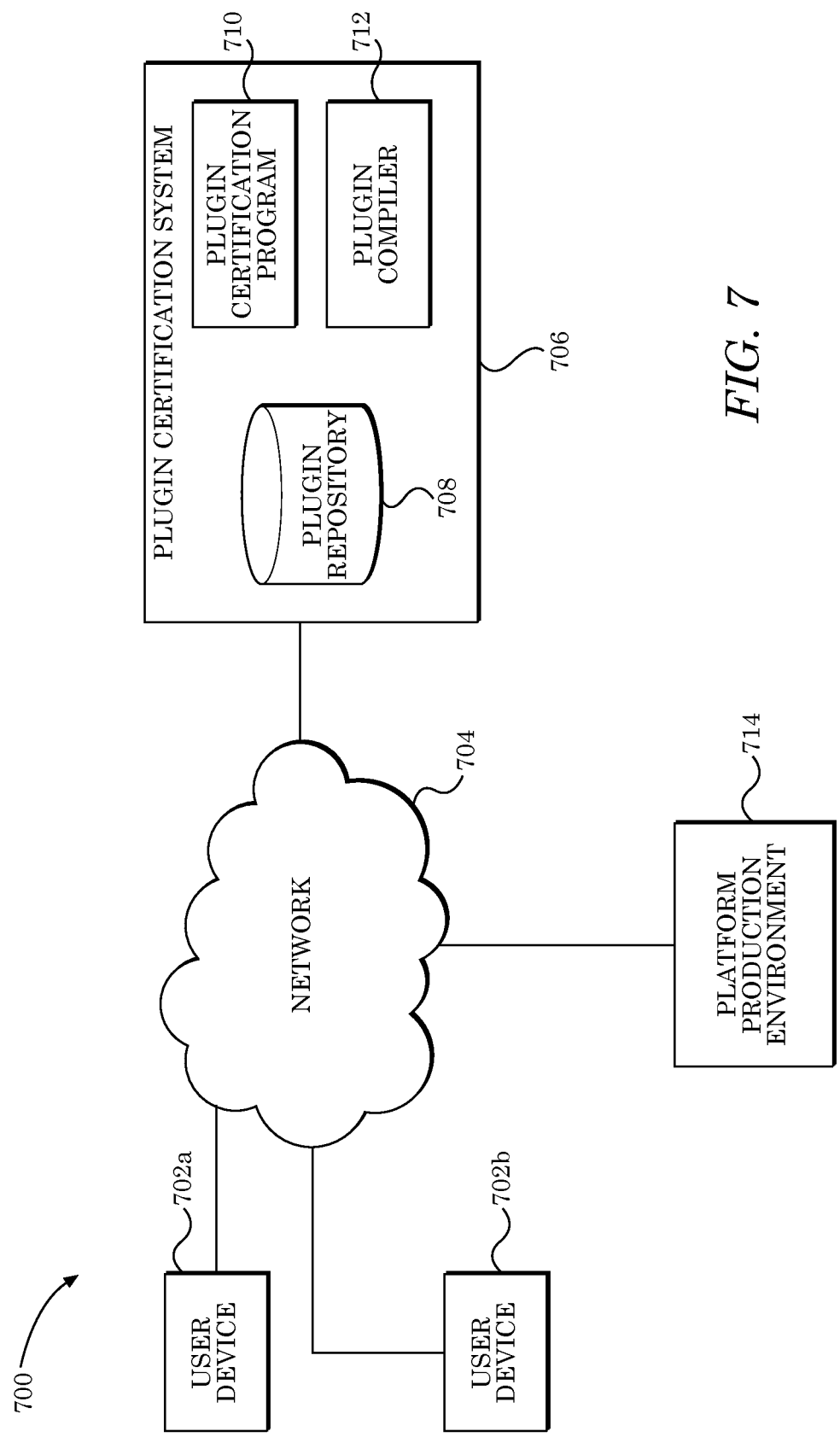
FIG. 7 is a block diagram of a system according to one or more embodiments.

Referring to FIG. 7, a block diagram of a system 700 according to some embodiments is shown. In some embodiments, the system 700 may comprise an application development platform (e.g., for a gaming platform) for use by one or more users (e.g., application developers). In some embodiments, the system 700 may comprise a plurality of user devices 702*a-b* (e.g., used by plugin developers) in communication with and/or via a network 704. In some embodiments, a plugin certification system 706 may be in communication with the network 704 and/or one or more of the user devices 702*a*-*b*. In some embodiments, the plugin certification system 706 and/or the user devices 702*a*-*b*) may be in communication with a platform production environment 714 (e.g., for serving web applications to players or other types of end users).

According to some embodiments, the plugin certification system 706 comprises a plugin repository 708 for receiving and storing plugin data defining plugins (e.g., source code). Plugin source code may be certified by plugin certification program 710 by comparing the source code to plugin platform standards (e.g., stored in one or more storage devices) and/or may be compiled using plugin compiler 712. If a plugin passes a plugin certification process, as discussed with respect to various embodiments, the resulting artefact for the plugin may be released for production use by transmitting the compiled plugin to the platform production environment 714.

According to some embodiments, any or all of the components 702*a*-*b*, 704, 706, 708, 710, 712, 714 of the system 700 may be similar in configuration and/or functionality to any similarly named and/or numbered components described herein. Fewer or more components 702*a*-*b*, 704, 706, 708, 710, 712, 714 (and/or portions thereof) and/or various configurations of the components 702*a*-*b*, 704, 706, 708, 710, 712, 714 may be included in the system 700 without deviating from the scope of embodiments described herein. While multiple instances of some components are depicted and while single instances of other components are depicted, for example, any component 702*a*-*b*, 704, 706, 708, 710, 712, 714 depicted in the system 700 may comprise a single device, a combination of devices and/or components 702*a*-*b*, 704, 706, 708, 710, 712, 714, and/or a plurality of devices, as is or becomes desirable and/or practicable. Similarly, in some embodiments, one or more of the various components 702*a*-*b*, 704, 706, 708, 710, 712, 714 may not be needed and/or desired in the system 700.

Figure 8:
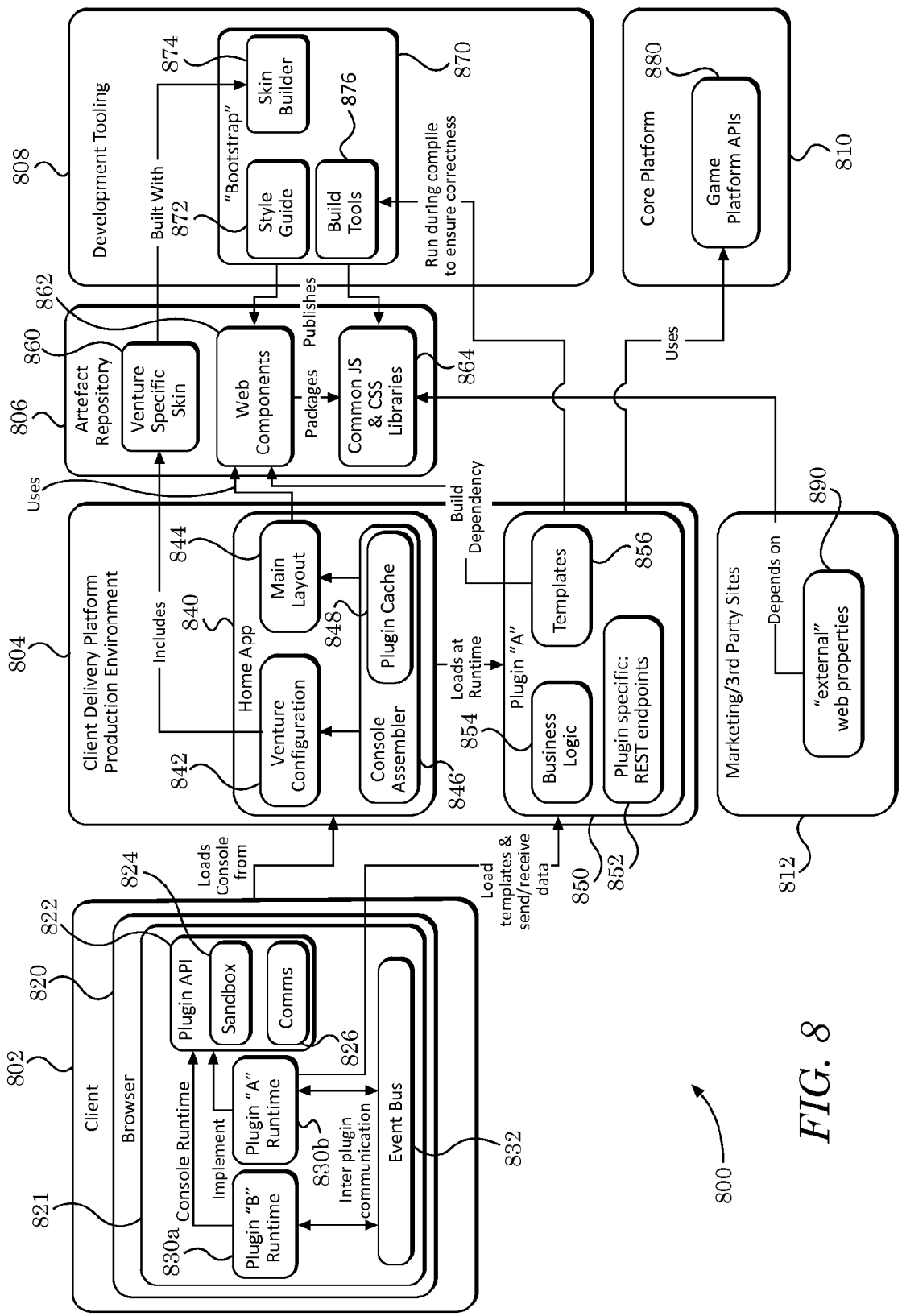
FIG. 8 is a diagram of a system according to one or more embodiments.

Referring to FIG. 8, a diagram of a system 800 (e.g., for an example on-line gaming environment) according to some embodiments is shown, including descriptions of various example functions facilitated by the system. In some embodiments, the system 800 may comprise an application development platform, a client delivery platform or platform production environment (e.g., for a gaming platform) for use by one or more client devices (e.g., used by end users of applications) and/or by one or more user devices (e.g., used by application developers) and/or one or more external marketing or third party websites. In some embodiments, the system 800 includes a client device 802, a client delivery platform production environment 104, an artefact repository 106, a development tooling system 108, core platform system 110 and/or marketing/third party websites 112.

In one example embodiment, as depicted in example system 800, the client device 102 comprises a browser application 120 executing an instance of a console 821. The console 821 (e.g., a web-based interface provided to registered players of an on-line gaming provider) comprises a plugin API 822 defining a plugin sandbox 824 and communications capabilities 826. The plugin API 822 controls functions of the console 821 in accordance with the runtime code for plugins 830*a* and 830*b*. Communications between and among different plugins 830*a*-*b* within the console 821 may be facilitated by event bus 832.

As depicted in FIG. 8, the runtime code for (and/or the specific logic and components defined by) a particular plugin (e.g., plugin 830*b*) may be transmitted to the client 802 and/or console 821 at console runtime. In one example implementation, the home app 840 assembles console 821 (e.g., using console assembler 846) based on stored information including one or more of: venture configurations 842, plugin cache 848, venture specific skins 860, main layout settings 844, web components 862 and/or common JS and/or CSS libraries. For example, in response to receiving a request of a client device for a particular website (e.g., for a specific venture) from the client delivery platform production environment 804, home app 840 loads all of the plugins required for the venture's console, including specifications for business logic 854, templates 856 and/or plugin-specific REST endpoints 852.

As depicted in FIG. 8, templates for a given plugin (e.g., plugin A) may comprise one or more of web components 862. One or more of the venture specific skins 860, web components 862 and/or common libraries 864 may be stored in one or more artefact repositories 806.

As depicted in FIG. 8, venture specific skins 860 may be developed with reference to skin builder system 874 of development tooling system 808. Similarly, one or more web components 862 may be developed with reference to definitions of a style guide 872, while source code compiled for a plugin may be verified at compile time using build tools 876 comprising one or more platform plugin standards and/or plugin certification processes. As depicted in FIG. 8, one or more the style guide, skin builder and/or build tools may be collected as a collection of bootstrap tools made available to software developers.

As depicted in FIG. 8, one or more plugins and/or consoles may provide access, in accordance with some embodiments, to one or more platform APIs 880 of core platform 810 (e.g., an on-line gaming platform). As depicted in FIG. 8, in accordance with one or more embodiments, a console 821 may provide access to services and/or functions of one or more marketing or other third party websites 812, based on common libraries 864 and/or definitions of external web properties 890.

One or more of various types of data storage devices may be used in accordance with one or more embodiments discussed in this disclosure. A data storage device may, for example, be utilized to store instructions and/or data, such as the instructions and/or data described in reference to one or more of the example computing devices in this disclosure. One or more types and/or combinations of data storage devices may generally store program instructions, code, and/or modules that, when executed by a processing device, cause a particular machine to function in accordance with one or more embodiments described in this disclosure. In some embodiments, instructions stored on a data storage device may, when executed by a processor (such as a processor device described in this disclosure with respect to one or more computing devices), cause the implementation of and/or facilitate the any of the methods, and/or portions or combinations of such methods, described in this disclosure. The following descriptions of some example types of data storage devices are representative of a class and/or subset of computer-readable media that are defined in this disclosure as "computer-readable memory" (e.g., non-transitory memory devices, as opposed to transmission devices or media).

According to some embodiments, a data storage device may comprise one or more various types of internal and/or external hard drives. The data storage device may, for example, comprise a data storage medium that is read, interrogated, and/or otherwise communicatively coupled to and/or via a disk reading device. In some embodiments, the data storage device and/or the data storage medium may be configured to store information utilizing one or more magnetic, inductive, and/or optical means (e.g., magnetic, inductive, and/or optical-encoding). The data storage medium may comprise one or more of a polymer layer, a magnetic data storage layer, a non-magnetic layer, a magnetic base layer, a contact layer, and/or a substrate layer. According to some embodiments, a magnetic read head may be coupled and/or disposed to read data from the magnetic data storage layer.

In some embodiments, a data storage medium may comprise a plurality of data points disposed with the data storage medium. The data points may, in some embodiments, be read and/or otherwise interfaced with via a laser-enabled read head disposed and/or coupled to direct a laser beam through the data storage medium.

In some embodiments, a data storage device may comprise a CD, CD-ROM, DVD, Blu-Ray™ Disc, and/or other type of optically-encoded disk and/or other storage medium that is or becomes know or practicable. In some embodiments, a data storage device may comprise a USB keyfob, dongle, and/or other type of flash memory data storage device that is or becomes know or practicable. In some embodiments, a data storage device may comprise RAM of any type, quantity, and/or configuration that is or becomes practicable and/or desirable. In some embodiments, a data storage device may comprise an off-chip cache such as a Level 2 (L2) cache memory device. According to some embodiments, a data storage device may comprise an on-chip memory device such as a Level 1 (L1) cache memory device.

The terms "computer-readable medium" and "computer-readable memory" refer to any medium that participates in providing data (e.g., instructions) that may be read by a computer and/or a processor. Such a medium may take many forms, including but not limited to non-volatile media, volatile media, and other specific types of transmission media. Non-volatile media include, for example, optical or magnetic disks and other persistent memory. Volatile media include DRAM, which typically constitutes the main memory. Other types of transmission media include coaxial cables, copper wire, and fiber optics, including the wires that comprise a system bus coupled to the processor.

Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable medium" and/or "tangible media" specifically exclude signals, waves, and wave forms or other intangible or transitory media that may nevertheless be readable by a computer.

Various forms of computer-readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined above and includes many exemplary protocols that are also applicable in this disclosure.

In some embodiments, one or more specialized machines such as a computerized processing device, a server, a remote terminal, and/or a customer device may implement the various practices described in this disclosure. A computer system of a gaming entity may, for example, comprise various specialized computers that interact to provide for online games as described in this disclosure.

D. Processes

According to some embodiments, processes described in this disclosure may be performed and/or implemented by and/or otherwise associated with one or more specialized and/or computerized processing devices (e.g., the player and/or user devices 102a-n, 202a-n, 302a-b, 402, 502, 702a-b, 802 and/or the servers and/or controller devices 110, 210a-n, 310a-g, 410e-f, 510a-j of FIG. 1, FIG. 2, FIG. 3, FIG. 4, and/or FIG. 5 in this disclosure), specialized computers, computer terminals, computer servers, computer systems (e.g., systems 700, 800) and/or networks, and/or any combinations thereof (e.g., by one or more application developers and/or developer devices). In some embodiments, methods may be embodied in, facilitated by, and/or otherwise associated with various input mechanisms and/or interfaces.

Any processes described in this disclosure do not necessarily imply a fixed order to any depicted actions, steps, and/or procedures, and embodiments may generally be performed in any order that is practicable unless otherwise and specifically noted. Any of the processes and/or methods described in this disclosure may be performed and/or facilitated by hardware, software (including microcode), firmware, or any combination thereof. For example, a storage medium (e.g., a hard disk, Universal Serial Bus (USB) mass storage device, and/or Digital Video Disk (DVD)) may store thereon instructions that when executed by a machine (such as a computerized processing device) result in performance according to any one or more of the embodiments described in this disclosure.

Figure 9:
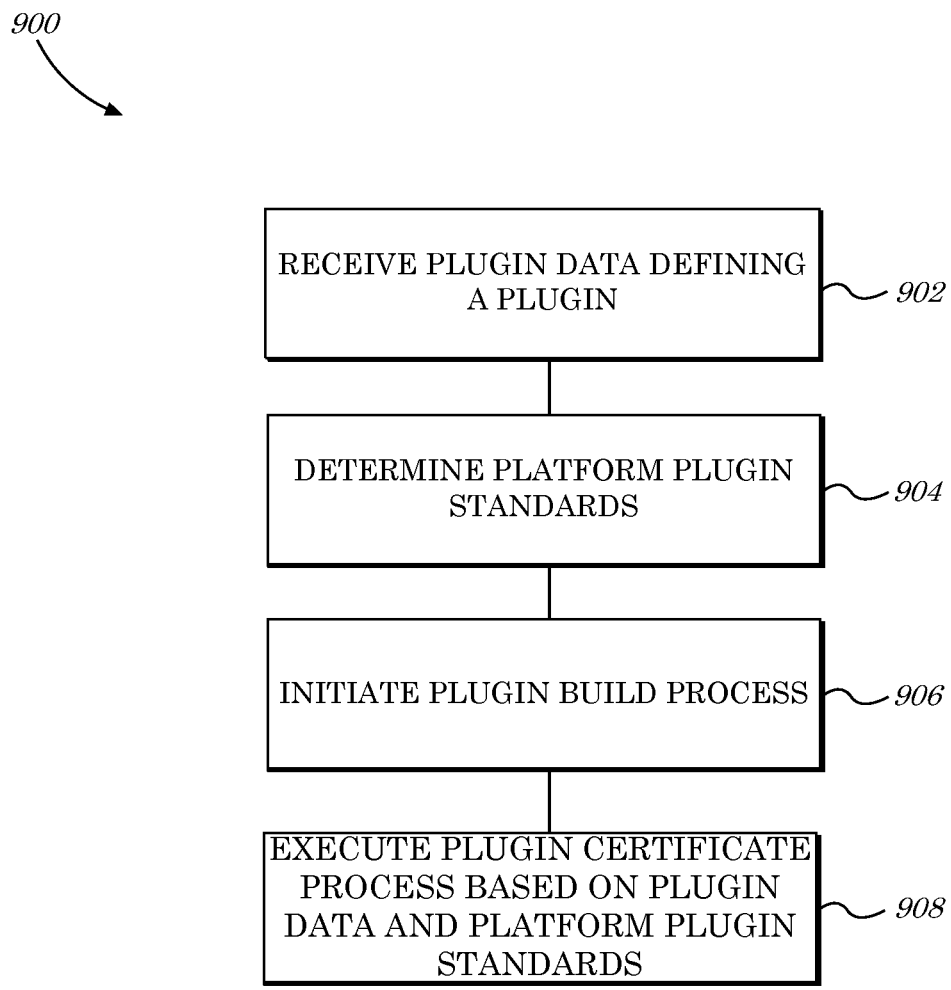
FIG. 9 is a flowchart of a method according to one or more embodiments.

Referring now to FIG. 9, a flow diagram of a method 900 according to some embodiments is shown. The method 900 may be performed, for example, by a server computer (e.g., of a plugin certification system). It should be noted that although some of the steps of method 900 may be described as being performed by a server computer while other steps are described as being performed by another computing device, any and all of the steps may be performed by a single computing device which may be a mobile device, desktop computer, or another computing device. Further any steps described in this disclosure as being performed by a particular computing device may, in some embodiments, be performed by a human or another computing device as appropriate.

According to some embodiments, the method 900 may comprise receiving plugin data defining a plugin, at 902 (e.g., receiving, from a developer by a data repository, plugin source code). The method 900 may further comprise determining platform plugin standards, at 904 (e.g., accessing and/or receiving values, definitions and/or predetermined requirements for verifying plugin source code). The method 900 may further comprise initiating (e.g., in accordance with a plugin certification process and/or by a source compiler) a plugin build process (e.g., to compile source code for one or more plugins), at 906. According to some embodiments, the method 900 may comprise executing a plugin certification process based on the plugin data and the platform plugin standards, at 908. As discussed with respect to various embodiments in this disclosure, executing a plugin certification process may comprise comparing instructions defined in plugin source code to one or more platform standards for CSS, style, syntax, naming conventions, restrictions on global state, global JavaScript™ variable access and/or plugin performance. In some embodiments, a plugin certification process may comprise outputting an indication of whether the plugin data passes all, some, one or none of the platform plugin standards and/or forwarding plugin build software to a production environment.

Figure 10:
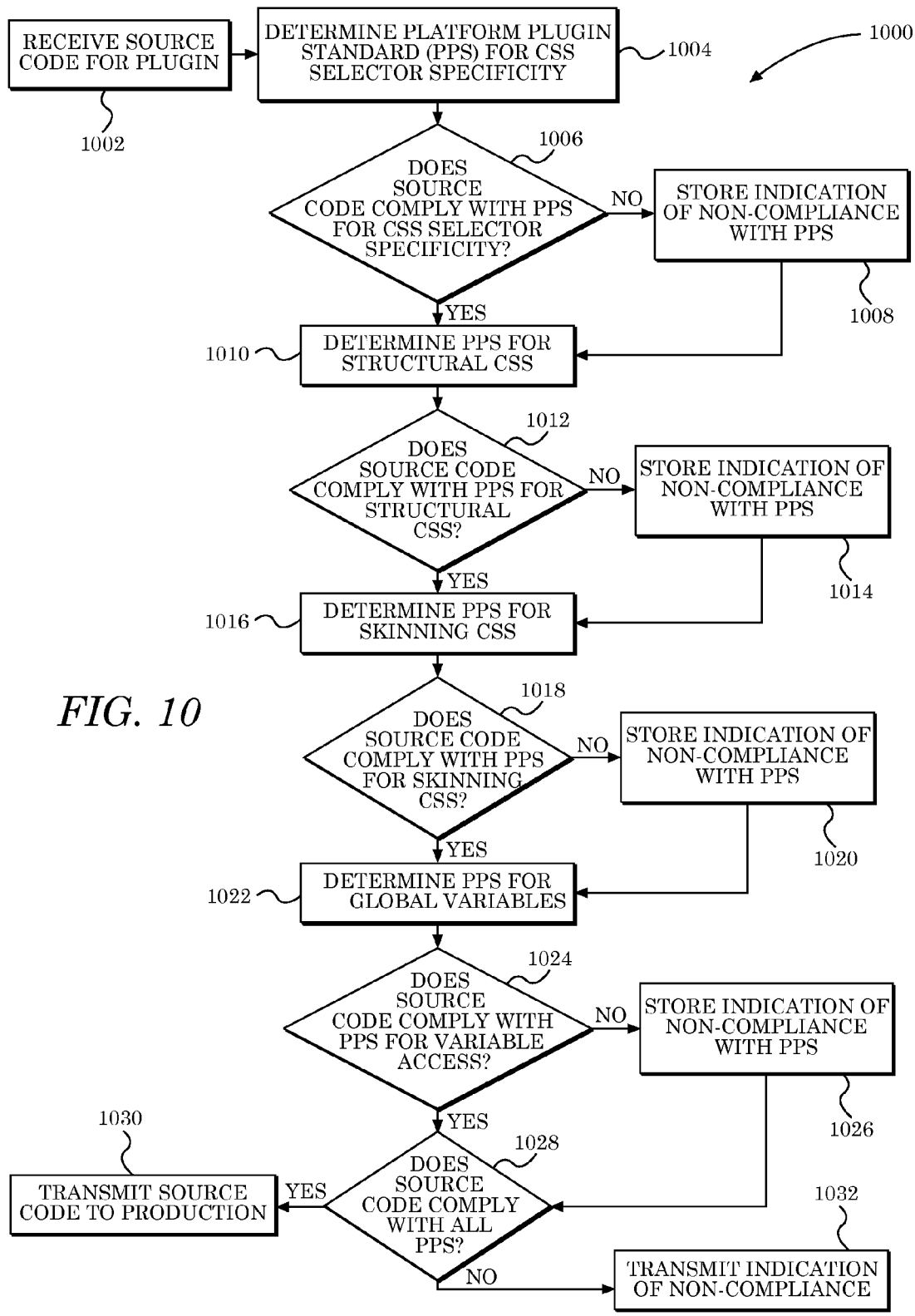
FIG. 10 is a flowchart of a method according to one or more embodiments.

Referring now to FIG. 10, a flow diagram of a method 1000 according to some embodiments is shown. The method 1000 may be performed, for example, by a server computer (e.g., of a plugin certification system). It should be noted that although some of the steps of method 1000 may be described as being performed by a server computer while other steps are described as being performed by another computing device, any and all of the steps may be performed by a single computing device which may be a mobile device, desktop computer, or another computing device. Further any steps described in this disclosure as being performed by a particular computing device may, in some embodiments, be performed by a human or another computing device as appropriate.

According to some embodiments, the method 1000 may comprise receiving source code for a plugin, at 1002, determining at least one platform plugin standard (PPS) for CSS selector specificity, at 1004, and determining whether the source code complies with the PPS for CSS selector specificity, at 1006. For instance, a build server may compare a CSS selector defined in the source code to an agreed-upon appropriate standard for CSS selector specificity for a development platform. If the source code does not comply with the PPS, then an indication of the non-compliance may be stored (e.g., for reporting and/or as a trigger to terminate a compile process), at 1008.

Similarly, the method 1000 may comprise one or more other types of specific checks for compliance with specific types of platform standards. Any such checks may be performed in any order and/or in parallel. The method 1000 may comprise, for example, determining PPS for structural CSS (at 1010), determining PPS for skinning CSS (at 1016) and/or determining PPS for global variables (e.g., JavaScript™ variables) (at 1022). The method 1000 may further comprise, as discussed with respect to various embodiments, making determinations as to whether the source code complies with the one or more respective PPS (at 1012, 1018, 1024), and storing a respective indication of non-compliance with the PPS where the checks fail (at 1008, 1014, 1020, 1026). The method 1000 may further comprise determining whether the source code complies with all PPS, at 1030, and, if so, transmitting the source code to production, at 1030 (and/or transmitting an indication that the source code is compliant and/or compiling the source code). If the source code did not comply with all PPS (e.g., as determined by accessing one or more stored indications of non-compliance during the plugin certification process), the method 1000 may further transmitting (e.g., to a developer via a user device) an indication that the source code is non-compliant, at 1032.

Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "in this disclosure" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described in this disclosure, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described in this disclosure (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described in this disclosure may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used in this disclosure is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system". A control system, as that term is used in this disclosure, may be a computer processor coupled with an operating system, device drivers, and appropriate programs (collectively "software") with instructions to provide the functionality described for the control system. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

As used in this disclosure, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used in this disclosure, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.32002® published by the Institute of Electrical and Electronics Engineers (IEEE). In some embodiments, a network may include one or more wired and/or wireless networks operated in accordance with any communication standard or protocol that is or becomes known or practicable.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication". As used in this disclosure, the term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory" and/or "tangible media" specifically exclude signals, waves, and wave forms or other intangible or transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described in this disclosure may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented in this disclosure are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described in this disclosure. Further, despite any depiction of the databases as tables, other formats (including relational databases, object-based models, hierarchical electronic file structures, and/or distributed databases) could be used to store and manipulate the data types described in this disclosure. Likewise, object methods or behaviors of a database can be used to implement various processes, such as those described in this disclosure. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used in this disclosure, the term "network component" may refer to a user or network device, or a component, piece, portion, or combination of user or network devices. Examples of network components may include a Static Random Access Memory (SRAM) device or module, a network processor, and a network communication path, connection, port, or cable.

As used in this disclosure, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described in this disclosure are associated with an "indication". As used in this disclosure, the term "indication" may be used to refer to any indicia and/or other information indicative of or associated with a subject, item, entity, and/or other object and/or idea. As used in this disclosure, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

In addition, some embodiments are associated with a "network" or a "communication network". As used in this disclosure, the terms "network" and "communication network" may be used interchangeably and may refer to an environment w in this disclosure one or more computing devices may communicate with one another, and/or to any object, entity, component, device, and/or any combination thereof that permits, facilitates, and/or otherwise contributes to or is associated with the transmission of messages, packets, signals, and/or other forms of information between and/or within one or more network devices. Such devices may communicate directly or indirectly, via a wired or wireless medium such as the Internet, LAN, WAN or Ethernet (or IEEE 802.3), Token Ring, or via any appropriate communications means or combination of communications means. In some embodiments, a network may include one or more wired and/or wireless networks operated in accordance with any communication standard or protocol that is or becomes known or practicable. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), the Fast Ethernet LAN transmission standard 802.3-2002® published by the Institute of Electrical and Electronics Engineers (IEEE), or the like. Networks may be or include a plurality of interconnected network devices. In some embodiments, networks may be hard-wired, wireless, virtual, neural, and/or any other configuration of type that is or becomes known. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

It will be readily apparent that the various methods and algorithms described in this disclosure may be implemented by, e.g., specially programmed computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

What is claimed is:

1. An apparatus for certifying compliance of plugins at build time comprising:
   a processor; and
   a computer-readable memory in communication with the processor, the computer-readable memory storing instructions that when executed by the processor direct the processor to:
   receive source code defining a plugin for a web application to be implemented via a client delivery system;
   determine a plurality of platform plugin standards for certifying plugins implemented via the client delivery system;
   initiate a plugin build process for the source code;
   execute a plugin certification process during the build process by comparing the source code to the plurality of platform plugin standards; and
   compile the source code for implementation via the client delivery system if the source code meets all of the plurality of platform plugin standards.

2. The apparatus of claim 1, wherein the plurality of platform plugin standards comprises a platform plugin standard for cascading style sheets (CSS).

3. The apparatus of claim 1, wherein the plurality of platform plugin standards comprises a platform plugin standard for structural CSS.

4. The apparatus of claim 1, wherein the plurality of platform plugin standards comprises a platform plugin standard for CSS selectors.

5. The apparatus of claim 1, wherein the plurality of platform plugin standards comprises a platform plugin standard for at least one of memory consumption and download speed characteristics of the plugin.

6. The apparatus of claim 1, wherein the plurality of platform plugin standards comprises a platform plugin standard for global variables.

7. The apparatus of claim 1, wherein the plurality of platform plugin standards comprises a platform plugin standard for maintaining a global state in a global environment.

8. The apparatus of claim 1, wherein the plurality of platform plugin standards comprises a platform plugin standard for naming conventions.

9. The apparatus of claim 1, the computer-readable memory storing instructions that when executed by the processor direct the processor to:
terminate the build process in response to determining that the source code does not comply with one or more of the platform plugin standards.

10. The apparatus of claim 1, the computer-readable memory storing instructions that when executed by the processor direct the processor to:
transmit the compiled source code to a production environment of the client delivery system.

11. An apparatus for certifying compliance of plugins at build time comprising:
a processor; and
a computer-readable memory in communication with the processor, the computer-readable memory storing instructions that when executed by the processor direct the processor to:
receive source code defining a plugin for a web application to be implemented via a client delivery system;
determine a plurality of platform plugin standards for certifying plugins implemented via the client delivery system;
initiate a plugin build process for the source code;
execute a plugin certification process during the build process by comparing the source code to the plurality of platform plugin standards; and
compile the source code for implementation via the client delivery system if the source code meets all of the plurality of platform plugin standards,
wherein the plurality of platform plugin standards comprises a platform plugin standard for maintaining separation of structural CSS from skinning CSS.

12. A method for certifying compliance of plugins at build time, comprising:
receiving, by a plugin certification system comprising at least one processor, source code defining a plugin for a web application to be implemented via a client delivery system;
determining, by the plugin certification system, a plurality of platform plugin standards for certifying plugins implemented via the client delivery system;
initiating, by the plugin certification system, a plugin build process for the source code;
executing, by the plugin certification system, a plugin certification process during the build process by comparing the source code to the plurality of platform plugin standards; and
compiling, by the plugin certification system, the source code for implementation via the client delivery system if the source code meets all of the plurality of platform plugin standards.

13. The method of claim 12, wherein the plurality of platform plugin standards comprises a platform plugin standard for CSS.

14. The method of claim 12, wherein the plurality of platform plugin standards comprises a platform plugin standard for structural CSS.

15. The method of claim 12, wherein the plurality of platform plugin standards comprises a platform plugin standard for CSS selectors.

16. The method of claim 12, wherein the plurality of platform plugin standards comprises a platform plugin standard for at least one of memory consumption and download speed characteristics of the plugin.

17. The method of claim 12, wherein the plurality of platform plugin standards comprises a platform plugin standard for document object model (DOM) elements.

18. The method of claim 12, wherein the plurality of platform plugin standards comprises a platform plugin standard for maintaining a global state in a global environment.

19. The method of claim 12, further comprising:
terminating the build process in response to determining that the source code does not comply with one or more of the platform plugin standards.

20. A method for certifying compliance of plugins at build time, comprising:
receiving, by a plugin certification system comprising at least one processor, source code defining a plugin for a web application to be implemented via a client delivery system;
determining, by the plugin certification system, a plurality of platform plugin standards for certifying plugins implemented via the client delivery system;
initiating, by the plugin certification system, a plugin build process for the source code;
executing, by the plugin certification system, a plugin certification process during the build process by comparing the source code to the plurality of platform plugin standards; and
compiling, by the plugin certification system, the source code for implementation via the client delivery system if the source code meets all of the plurality of platform plugin standards,
wherein the plurality of platform plugin standards comprises a platform plugin standard for maintaining separation of structural CSS from skinning CSS.

* * * * *